(12) United States Patent
Ide

(10) Patent No.: US 6,361,290 B1
(45) Date of Patent: Mar. 26, 2002

(54) SUCTION MUFFLER AND HERMETIC COMPRESSOR

(75) Inventor: Terumasa Ide, Fujisawa (JP)

(73) Assignee: Matsushita Refrigeration Company, Osaka (JP)

( * ) Notice: Subject to any disclaimer, the term of this patent is extended or adjusted under 35 U.S.C. 154(b) by 0 days.

(21) Appl. No.: 09/719,426

(22) PCT Filed: Apr. 10, 2000

(86) PCT No.: PCT/JP00/02335

§ 371 Date: Dec. 11, 2000

§ 102(e) Date: Dec. 11, 2000

(87) PCT Pub. No.: WO00/63558

PCT Pub. Date: Oct. 26, 2000

(30) Foreign Application Priority Data

Apr. 15, 1999 (JP) .............................. 11-107932

(51) Int. Cl.⁷ .......................... F04B 39/00; F04B 17/00
(52) U.S. Cl. ....................................... 417/312; 417/902
(58) Field of Search ............................... 417/312, 902; 181/249, 269, 272

(56) References Cited

U.S. PATENT DOCUMENTS 4,401,418 A * 8/1983 Fritchman ................... 417/312
5,304,044 A * 4/1994 Wada et al. ................. 417/312
5,545,860 A * 8/1996 Wilkes et al. ............... 181/255

FOREIGN PATENT DOCUMENTS

JP  10-252653  * 9/1998

* cited by examiner

*Primary Examiner*—Charles G. Freay
*Assistant Examiner*—Michael K. Gray
(74) *Attorney, Agent, or Firm*—Sheridan Ross P.C.

(57) ABSTRACT

The present invention provides a suction muffler comprising component portions formed by injection forming a thermoplastic synthetic resin and joined to each other by induction welding, and also provides a hermetic compressor including the suction muffler. The suction muffler having this configuration is superior to conventional suction mufflers having joint portions joined by ultrasonic welding and vibration welding in the uniformity of the welding strength at the whole joint portion thereof and in minimizing the occurrence of fins.

16 Claims, 17 Drawing Sheets

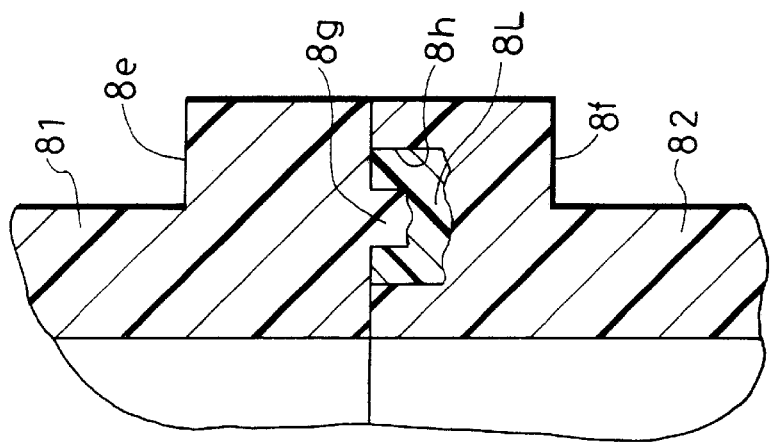
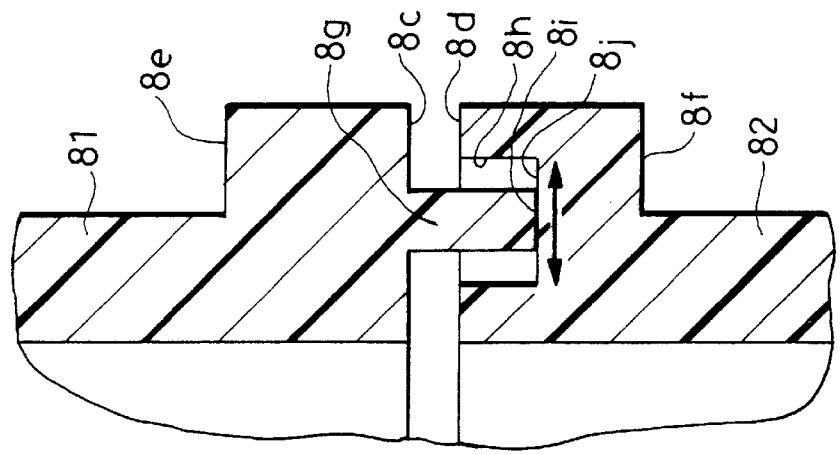
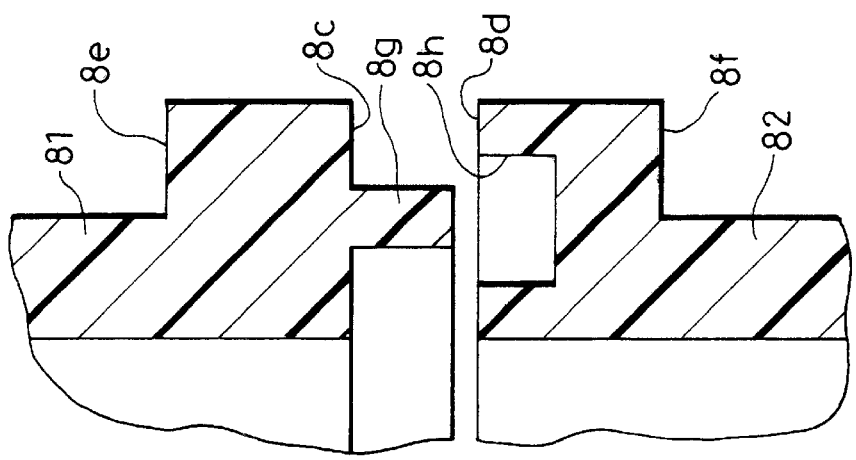

US 6,361,290 B1

SUCTION MUFFLER AND HERMETIC COMPRESSOR

TECHNICAL FIELD

The present invention relates to a hermetic compressor (hereinafter referred to as a compressor) for use with electric refrigerators, air conditioners and the like, and more particularly to a suction muffler included in the compressor.

BACKGROUND ART

The principle of refrigeration in electric refrigerators, air conditioners and the like is described below briefly. A compressor is used to compress a refrigerant gas to raise its pressure. The high-pressure refrigerant gas is cooled and liquefied. When the liquefied gas vaporizes in an evaporator, the gas extracts vaporization heat from the air inside a refrigerator or a room. The evaporated refrigerant gas is returned to the compressor. The above-mentioned operation is repeated, thereby lowering the temperature of the air inside the refrigerator or the room. In the present invention, the above-mentioned change of the refrigerant from being discharged from the compressor to returning to the compressor is referred to as a refrigeration cycle.

Refrigerants based on hydrofluorocarbon (HFC) or hydrocarbon (HC) not including chlorine are used as refrigerants. In recent years, these refrigerants have been used frequently instead of chlorofluorocarbon-based refrigerants that have been prohibited because they destroy the ozone layer. In particular, the HC-based refrigerants do not significantly cause the greenhouse effect, whereby the use of the HC-based refrigerants is also intended to prevent global warming.

The compressor disclosed in Japanese Patent Publication No. Hei 3-45212 for example is known as a conventional compressor. This compressor is hereinafter referred to as the compressor of conventional example 1. FIG. 8 is a sectional plan view showing the inside of the compressor of the conventional example 1.

A hermetic shell 1 is substantially cylindrical, and its diameter is nearly equal to its height. The upper face and the lower face of the hermetic shell 1 are sealed to make its inner space hermetic. A known compressing mechanism 2, an electric motor 3 and a suction muffler 18 are accommodated inside the hermetic shell 1.

The electric motor 3 is elastically supported by springs on three snubbers 13 disposed at the bottom of the inside of the hermetic shell 1. Furthermore, the electric motor 3 is installed so that its shaft becomes substantially coaxial with the hermetic shell 1. The electric motor 3 is electrically connected to an external power supply via a terminal connector 11.

The compressing mechanism 2 comprises a cylinder 4, a piston 5 and a crank portion 12, and is disposed on the electric motor 3. The crank portion 12 is connected to the upper end of the shaft of the electric motor 3. The piston 5 reciprocates inside the cylinder 4 in the horizontal direction by virtue of the revolving force of the electric motor 3 transmitted via the crank portion 12. The space inside the cylinder 4 through which the piston 5 reciprocates is closed by the front end of the piston 5 and a valve plate 6 thereby to form a compression chamber (not shown) for compressing a refrigerant gas. The valve plate 6 is provided with a suction valve for supplying the refrigerant gas into the compression chamber by suction, and a discharge valve for discharging the refrigerant gas from the compression chamber. These valves are not shown in FIG. 8. A cylinder head 7 is disposed outside the compression chamber, with the valve plate 6 held therebetween. A discharge pipe 10 is connected to the cylinder head 7 so that the refrigerant gas can be discharged from the inside of the cylinder head 7 to the outside of the hermetic shell 1.

On the other hand, the suction muffler 18 is connected to the outside space 18b of the compression chamber. The inside of the suction muffler 18 is provided with a cavity communicating from the outside space 18b of the compression chamber to the suction inlet 18a of the suction muffler 18. The suction inlet 18a is disposed opposite to the opening end 9a of a suction pipe 9 with a predetermined distance therebetween. The suction pipe 9 supplies the refrigerant gas by suction from the outside to the inside of the hermetic shell 1.

The conventional hermetic compressor having the above-mentioned structure operates as described below thereby to raise the pressure of the refrigerant gas and to supply the high-pressure refrigerant gas to an external refrigeration cycle.

When the electric motor 3 is driven, the piston 5 is reciprocated inside the cylinder 4 by the crank portion 12. The space inside the compression chamber is changed periodically in accordance with the reciprocation. The pressure of the refrigerant gas inside the compression chamber lowers while the space inside the compression chamber increases. At this time, the suction valve (not shown) is opened by the pressure difference between the pressure at the outside space 18b of the compression chamber and the pressure inside the compression chamber thereby to suck the refrigerant gas from inside the suction muffler 18. On the other hand, the pressure of the refrigerant gas inside the compression chamber rises while the space inside the compression chamber decreases. At this time, the discharge valve (not shown) is opened by the pressure difference between the pressure inside the cylinder head 7 and the pressure inside the compression chamber, whereby the high-pressure refrigerant gas is discharged from the compression chamber into the cylinder head 7. The high-pressure refrigerant gas inside the cylinder head 7 passes through the discharge pipe 10 and is discharged to the high-pressure side of the refrigeration cycle outside the hermetic shell 1. The high pressure of the refrigerant gas is lowered in the refrigeration cycle. The refrigerant gas flowing from the low-pressure side of the refrigeration cycle passes through the suction pipe 9 and is supplied from the opening end 9a thereof to the hermetic shell 1. The refrigerant gas supplied from the opening end 9a almost directly enters the suction inlet 18a of the suction muffler 18. By periodically repeating the above-mentioned operation, the compressor of the conventional example 1 continuously supplies the high-pressure refrigerant gas to the refrigeration cycle.

The inner space in the hermetic shell 1 is sealed from outside. Therefore, noise caused by the electric motor 3, the compressing mechanism 2, the refrigerant gas sucked into the compression chamber and the like is unlikely to leak outside. Furthermore, the hermetic shell 1 prevents lubrication oil circulating through the various portions of the electric motor 3 and the compressing mechanism 2 from scattering outside. In addition, the hermetic shell 1 stores the lubrication oil at the bottom of its inner space to prevent them from leaking outside.

The suction muffler 18 serves to attenuate noise caused by a high-speed refrigerant gas flow sucked into the compression chamber. The refrigerant gas supplied into the suction muffler 18 advances through the cavity inside the suction muffler 18, and is sucked from the outside space 18b of the compression chamber inside the cylinder 4 into the compression chamber. The shape of the cavity inside the suction muffler 18 is devised so as to sufficiently decrease the speed of the refrigerant gas flow while the refrigerant gas passes. For example, the suction muffler 18 may have partition walls (not shown in FIG. 8) so that the cavity inside the suction muffler 18 is partitioned into several chambers by the partition walls. In this case, the refrigerant gas flow snakes through the chambers inside the suction muffler 18 in sequence, whereby the speed of the flow is lowered. This lowers the level of the noise caused by the refrigerant gas flow in the vicinity of the outside space 18b of the compression chamber.

As described below, the suction muffler 18 also operates to separate mist-like lubrication oil included in the refrigerant gas inside the suction muffler 18 so that the lubrication oil cannot be sucked into the compression chamber. When the refrigerant gas is sucked into the suction muffler 18 through the suction inlet 18a, lubrication oil floating in mist in the space inside the hermetic shell 1 is also sucked together with the refrigerant gas. If the mist-like lubrication oil is directly sucked into the compression chamber, the lubrication oil may attach to the suction valve or the discharge valve, thereby deteriorating their functions. Furthermore, if the lubrication oil is discharged to the refrigeration cycle through the discharge pipe 10, the lubrication oil may attach to various portions in the refrigeration cycle, thereby deteriorating the refrigeration capability of the refrigeration cycle. However, since the cavity inside the suction muffler 18 is partitioned into the plural chambers as described above, the refrigerant gas flow snakes through the chambers. At this time, the lubrication oil included in the refrigerant gas is apt to collide with and attach to the walls partitioning the cavity inside the suction muffler 18, since the lubrication oil is generally heavier than the refrigerant gas. The lubrication oil attached to the walls as described above flows downward inside the suction muffler 18, and is discharged from a small hole (not shown) provided at the bottom portion of the suction muffler 18 to the bottom of the inside of the hermetic shell 1.

As described above, the suction muffler 18 is made intended to sufficiently decrease the speed of the refrigerant gas passing through the inside thereof and to separate the mist-like lubrication oil included in the refrigerant gas. Accordingly, the suction muffler 18 generally has a complicated shape.

In addition, the suction muffler 18 is also made intended that the high heat of the electric motor 3 is unlikely to be transferred to the refrigerant gas before it is sucked. If the temperature of the refrigerant gas rises before it is sucked, the density of the refrigerant gas lowers. If this occurs, the pressure of the refrigerant gas pressurized inside the compression chamber may not reach a predetermined level. To prevent this problem, it is necessary to lower the thermal conductivity of the suction muffler 18.

For this reason, the suction muffler 18 is generally made of a thermoplastic synthetic resin having high formability and low thermal conductivity. Furthermore, the suction muffler 18 is formed by joining plural complicated structural portions. FIG. 9 is a perspective view showing the conventional suction muffler 18 formed as described above, and FIG. 10 is an exploded perspective view thereof. As shown in FIG. 10, the suction muffler 18 comprises two portions 181 and 182. The portions 181 and 182 are each formed of a thermoplastic synthetic resin by injection molding. As clearly shown in FIG. 9 and FIG. 10, the joining face 18c of the portion 181 is made contact with the joining face 18d of the portion 182. Both the joining faces 18c and 18d have been joined by conventional ultrasonic welding.

The ultrasonic welding has been carried out as described below. FIG. 11 is a magnified vertical sectional view showing the vicinities of the joining faces 18c and 18d. Parts (a), (b) and (c) of FIG. 11 show the conditions of the joint portion of the portions 181 and 182 at the time before welding, at the time during welding and at the time after welding respectively. As shown in the part (a) of FIG. 11, the joining face 18c has a projection 18g, and the joining face 18d has a groove 18h, the width of which is substantially identical to that of the projection 18g. The projection 18g is fitted in the groove 18h. As indicated by the arrows shown in the part (a) of FIG. 11, pressing force is applied vertically to the joining faces 18c and 18d from flanges 18e and 18f disposed on the rear sides of the joining faces 18c and 18d respectively. In the condition wherein the joining faces 18c and 18d make contact with each other without substantial gap, ultrasonic wave is transmitted to the vicinity of the tip 18i of the projection 18g. Then, as indicated by the arrows shown in the part (b) of FIG. 11, the tip 18i of the projection 18g and the bottom 18j of the groove 18h vibrate and repeatedly collide with each other. This heats and melts the resins in the vicinities of the tip 18i of the projection 18g and the bottom 18j of the groove 18h. The transmission of the ultrasonic wave is stopped when the gap between the projection 18g and the groove 18h is completely filled with a melted resin 18k. Then, the melted resin 18k solidifies as shown in the part (c) of FIG. 11, thereby securing the projection 18g to the groove 18h. In this way, the portions 181 and 182 are joined to each other.

The compressor disclosed in the Japanese Laid-open Patent Application No. Hei 10-252653 is also known as a conventional compressor different from the conventional example 1. This compressor is hereinafter referred to as the compressor of conventional example 2. FIG. 12 is a sectional plan view showing the inside of the compressor of the conventional example 2. Just as in the case of the conventional example 1, the compressor of the conventional example 2 comprises an electric motor 3, a compressing mechanism 2 and a suction muffler 8 hermetically sealed inside a hermetic shell 1. The basic configuration of the conventional example 2 is completely the same as that of the conventional example 1. The same components are accordingly represented by the same reference signs and their descriptions are omitted. The conventional example 2 differs from the conventional example 1 in the following points: a) the compressing mechanism 2 is disposed under the electric motor 3, b) the suction inlet 8a of the suction muffler 8 is connected to the opening end 9a of the suction pipe 9, and c), as the most important difference, the joining faces of the suction muffler 8 are welded in a different method.

FIG. 14 is a perspective view showing the suction muffler 8, and FIG. 15 is an exploded perspective view thereof. As shown in FIG. 15, the suction muffler 8 comprises two portions 81 and 82. The portions 81 and 82 are each formed by injection molding a thermoplastic synthetic resin. As clearly shown in FIGS. 14 and 15, the joining face 8c of the portion 81 is made contact with the joining face 8d of the portion 82. In contrast to the conventional example 1, in the conventional example 2, the joining faces 8c and 8d are joined to each other by vibration welding.

In the case of the conventional example 2, the shapes of the joining faces 8c and 8d each have two forms.

FIG. 16 is a magnified vertical sectional view showing the vicinities of the joining faces 8c and 8d in accordance with one form. Parts (*a*) and (*b*) of FIG. 16 show the conditions of the joint portion at the time during welding and at the time after welding respectively. In this form, both the joining faces 8*c* and 8*d* are flat faces. In the condition wherein both the flanges 8*e* and 8*f* are pressurized so that the joining face 8*c* makes contact with the joining face 8*d* on the whole, the upper portion 81 is vibrated against the lower portion 82 in parallel with the joining faces 8*c* and 8*d* as indicated by the arrows in the part (*a*) of FIG. 16. As a result, the joining faces 8*c* and 8*d* are rubbed with each other, and friction heat is generated. This friction heat starts melting the portions 81 and 82 made of a thermoplastic synthetic resin. The vibration is stopped when predetermined heights of the portions 81 and 82 are melted in the vertical direction from the joining faces 8*c* and 8*d*. The melted portion 8L of the joint portion then becomes cool and solidifies as shown in the part (*b*) of FIG. 16. As a result, the portions 81 and 82 are joined to each other.

In this form, the joining faces 8*c* and 8*d* are melted on the whole, thereby obtaining high welding strength. However, on the other hand, the melted portion is apt to be squeezed out of the joining faces 8*c* and 8*d* at the time of welding.

FIG. 17 is a magnified vertical sectional view showing the vicinities of the joining faces 8*c* and 8*d* in accordance with the other form. Parts (*a*), (*b*) and (*c*) of FIG. 17 show the conditions of the joint portion at the time before welding, at the time during welding and at the time after welding respectively. In this form, the upper joining face 8*c* is provided with a projection 8*g*, and the lower joining face 8*d* is provided with a groove 8*h*. As shown in the part (*b*) of FIG. 17, pressing force is applied to both the flanges 8*e* and 8*f* so that the tip 8*i* of the projection 8*g* makes contact with the bottom 8*j* of the groove 8*h*. In this condition, the upper portion 81 is vibrated against the lower portion 82 in parallel with the joining faces 8*c* and 8*d* as indicated by the arrows in the part (*b*) of FIG. 17. The width of the groove 8*h* is made larger than that of the projection 8*g* by the amplitude of the vibration. As a result, the tip 8*i* of the projection 8*g* are rubbed with the bottom 8*j* of the groove 8*h*, thereby generating friction heat. This friction heat starts melting the tip 8*i* of the projection 8*g* made of a synthetic resin. The vibration is stopped when a predetermined height of the tip 8*i* of the projection 8*g* is melted. At this time, the length of the projection 8*g* and the depth of the groove 8*h* have been set so that the gap between the projection 8*g* and the groove 8*h* is filled with the melted portion 8L, and the joining faces 8*c* and 8*d* make contact with each other on the whole. The melted portion 8L then becomes cool and solidifies as shown in the part (*c*) of FIG. 17. As a result, the portions 81 and 82 are joined to each other.

In this form, the gap in the groove 8*h* is filled with the melted portion 8L. Therefore, the melted portion 8L is unlikely to be squeezed out of the joining faces 8*c* and 8*d*. On the other hand, welding occurs only in the vicinity of the projection 8*g*, whereby the welding strength in this form is less than that of the form shown in FIG. 16.

The above-mentioned suction muffler welding methods in the conventional hermetic compressors have problems described below.

In both cases of the ultrasonic welding used for the assembly of the suction muffler 18 in accordance with the conventional example 1 and the vibration welding used for the assembly of the suction muffler 8 in accordance with the conventional example 2, the contact portions of the joining faces are vibrated to generate heat. However, the portions formed by injection forming a synthetic resin generally have warps. The warps are caused by the nonuniformity in injection pressure or metal mold temperature. These kinds of warps generally occur on both the joining faces in the conventional examples 1 and 2, thereby making the joining faces uneven. If the joining faces are uneven, the joining faces cannot make contact with each other uniformly on the whole. As a result, the degree of heating by the vibration becomes nonuniform at the joining faces on the whole. Therefore, the heating temperature of the whole joining faces becomes nonuniform, whereby the volume of the melted portion becomes different at various portions of the joining faces. As a result, the welding strength of the whole joining faces becomes nonuniform. If the welding strength is nonuniform as described above, the stress caused at the joint portion of the suction muffler by the vibration of the electric motor and the like concentrates on a portion having low welding strength, whereby a gap is likely to occur at the portion. If a large amount of lubrication oil enters the suction muffler from the gap and accumulates inside the compression chamber, the lubrication oil inside the compression chamber excessively transmits the pressing force of the piston, thereby causing a danger of breaking the suction valve and the discharge valve. In addition, the lubrication oil circulates in the refrigeration cycle outside the compressor, and stagnates at the evaporator, thereby causing improper refrigeration. Furthermore, the gap at the joint portion is widened by the vibration of the electric motor and the like. If the various portions constituting the suction muffler are misaligned eventually as the result of the widened gap, there is a possibility of causing large abnormal noise.

A method of increasing the pressing force applied to the joining faces at the time of the welding or a method of extending the time of the vibration are available to raise the welding strength to the extent that no gap occurs even if the stress concentrates on a portion having low welding strength as described above. These methods are intended to raise the welding strength by increasing the volume of the resin to be melted. However, in these methods, it is inevitable that the amount of the melted resin becomes excessive at some portions. At these portions, the melted resin is apt to be squeezed out of the joining faces. The portions squeezed outside result in the so-called "fins" when cooled. If the broken pieces of the fins drop into the suction muffler during the operation of the compressor and then enters the compressor, they are caught between the piston and the partition wall of the cylinder, thereby causing a danger of preventing the piston from reciprocating smoothly. Alternatively, they are caught at the suction valve or the discharge valve, thereby causing a danger of damaging the hermetic sealing of the compression chamber. Both of these cases cause a problem of hindering the pressure of the refrigerant gas from rising to a predetermined value.

The heating temperature on the joining faces at the time of the vibration welding is more uniform than that at the time of the ultrasonic welding, because the vibration of the joining faces owing to the ultrasonic welding is generally nonuniform on the whole joining faces. On the other hand, the whole joining faces can be vibrated uniformly at the time of the vibration welding. However, as long as the heating is carried out by vibration as described above, even if the vibration welding is used, it is impossible to eliminate the nonuniformity in the heating temperature owing to the unevenness on the joining faces.

Furthermore, the vibration welding has the following problems. If the frequency is raised excessively during the vibration welding, the whole joining faces cannot vibrate uniformly. Therefore, the amplitude of the vibration is required to be large to some extent in order to obtain sufficient heating temperature in the vibration welding. For this reason, in the vibration welding, the widths of the joining faces in the vibration direction cannot be made smaller than a certain value. For example, as shown in the part (b) of FIG. 17, it is necessary that the width of the groove 8h in the joining face 8d is larger than the width of the projection 8g on the joining face 8c by the amplitude of the vibration. Since the width of the groove 8h is large, the whole widths of the joining faces 8c and 8d are made large to maintain the strength of the joint portion. For this reason, the widths of the flanges 8e and 8f are larger than the widths required for pressing force application at the time of welding. The large widths of the flanges 8e and 8f are not desirable since it is necessary to accommodate the suction muffler 8 inside the hermetic shell 1 as compact as possible. Furthermore, since the gap between the groove 8h and the projection 8g is wide, a large amount of melted portion is required to fill in the gap. Therefore, a long time is required for the welding, and it is difficult to adjust the time for the welding. In other words, if the amount of the melted portion is large, the melted portion is likely to overflow from the groove 8h. On the other hand, if the amount of the melted portion is small, a gap remains between the groove 8h and the projection 8g, thereby lowering welding strength.

DISCLOSURE OF INVENTION

The present invention is intended to provide a compressor having a suction muffler assembled by mutually and stably joining the portions thereof made of a thermoplastic synthetic resin at uniform welding strength without causing fins.

A hermetic compressor in accordance with the present invention comprises:
  a hermetic shell having a hermetically sealed inner space;
  an electric motor elastically supported inside the hermetic shell;
  a compressing mechanism driven by the electric motor and used to compress a refrigerant gas thereby to raise the pressure thereof; and
  a suction muffler for passing said refrigerant gas prior to said compressing mechanism, and having:
    a) plural portions made of a thermoplastic resin and to be joined to each other at a joint portion by induction welding, and
    b) a loop conductor embedded in said joint portion between the portions along the joint portion.

With this configuration, the component portions of the suction muffler in accordance with the present invention are joined to each other by induction welding using the conductor embedded in the joint portion. The temperature of the whole conductor becomes uniform by virtue of induction heating using the conductor. Therefore, even if the joint portion is uneven owing to warps caused at the time of molding, the temperature of the joint portion becomes uniform. For this reason, the volume of a melted portion is uniform at the whole joint portion. As a result, the strength of welding also becomes uniform on the whole. In this way, the joint portion of the suction muffler becomes stable.

In the above-mentioned suction muffler in accordance with the present invention, one of the portions may be provided with a projection, the other portion may be provided with a groove to accommodate the projection, and the conductor may be disposed and secured between the tip of the projection and the groove by welding.

With this configuration, the portion melted at the time of welding accumulates in the groove and fills in the gap between the projection and the groove. Therefore, the melted portion is not squeezed outside from the joint portion, thereby eliminating a danger of causing fins.

It is preferable that the width of the projection is substantially identical to that of the groove.

This configuration eliminates any gap through which the melted portion accumulated in the groove is squeezed outside from the groove. Therefore, the melted portion is unlikely to cause fins. In addition, the volume of the gap between the projection and the groove to be filled with the melted portion is small. Therefore, the time for welding can be shortened, and the welding can be carried out securely. As a result, uniform welding strength can be obtained at the whole joint portion.

In the above-mentioned suction muffler in accordance with the present invention from another point of view, said joint portion may be substantially on plural planes of different levels.

With this configuration, it is possible to form a suction muffler by joining complicated portions having curved joining faces. This makes it possible to form a suction muffler having a shape offering a higher sound-attenuating effect.

In a preferred embodiment of the suction muffler in accordance with the present invention, the width of the vertical cross section of the conductor is substantially identical to the thickness thereof.

This configuration reduces the ratio of the circumferential length of the conductor with respect to the vertical cross section thereof. In other words, this configuration decreases the area of the resin making contact with the conductor. Therefore, the welded portion is relatively small with respect to the joint portion. For this reason, the melted portion is unlikely to be squeezed outside from the joint portion at the time of welding, thereby eliminating a danger of causing fins. Furthermore, when the conductor is secured between the projection and the groove as described above, the widths of the projection and the groove required at the time of welding are small. Therefore, the width of the joint portion can be reduced to the extent required to obtain sufficient welding strength.

In another preferred embodiment of the suction muffler in accordance with the present invention, the width of the vertical cross section of the conductor is substantially larger than the thickness thereof.

With this configuration, since the thickness of the conductor is small, the distance between the portions of the suction muffler at the joint portion is small at the time of welding. This shortens the time for welding, and reduces the volume of the welded portion. As a result, the melted portion is unlikely to be squeezed outside from the joint portion at the time of welding, thereby eliminating a danger of causing fins.

In still another preferred embodiment of the suction muffler in accordance with the present invention, the conductor is substantially helical.

With this configuration, the volume of the melted portion is large with respect to the volume of the conductor at the joint portion. Therefore, the strength of welding is high.

In yet still another preferred embodiment of the suction muffler in accordance with the present invention, the conductor has plural holes with axes orthogonal to the longitudinal direction thereof.

With this configuration, the volume of the melted portion incorporating the conductor with the holes is larger than the volume of the melted portion incorporating a conductor with no hole by the volume of the spaces inside the holes. In addition, the sectional area of the melted portion in parallel with the joining faces is made larger, thereby ensuring higher welding strength.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWINGS

FIG. 17(a), FIG. 17(b) and FIG. 17(c) are magnified vertical sectional views showing the vicinity of the joint portion before, during and after welding of the upper portion 81 and the lower portion 82 having the other form and constituting the suction muffler 8 in accordance with the conventional example 2; Parts (a), (b) and (c) of FIG. 17 show the conditions of the joint portion at the time before welding, at the time during welding and at the time after welding respectively.

It will be recognized that some or all of the Figures are schematic representations for purposes of illustration and do not necessarily depict the actual relative sizes or locations of the elements shown.

BEST MODE FOR CARRYING OUT THE INVENTION

Most preferred embodiments of a compressor in accordance with the present invention will be described below.

EMBODIMENT 1

Figure 12:
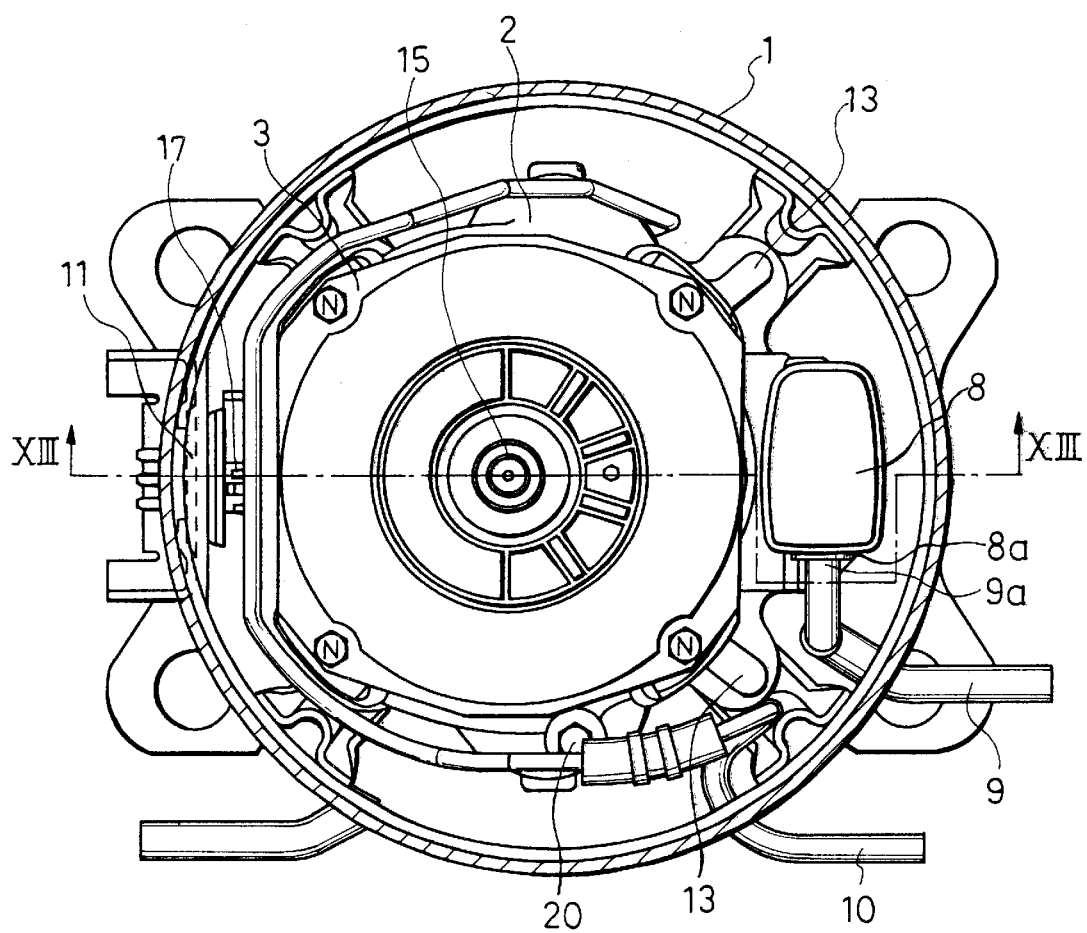
FIG. 12 is a sectional plan view showing the inside of a hermetic compressor in accordance with conventional example 2 and the embodiment 1 of the present invention.
Figure 13:
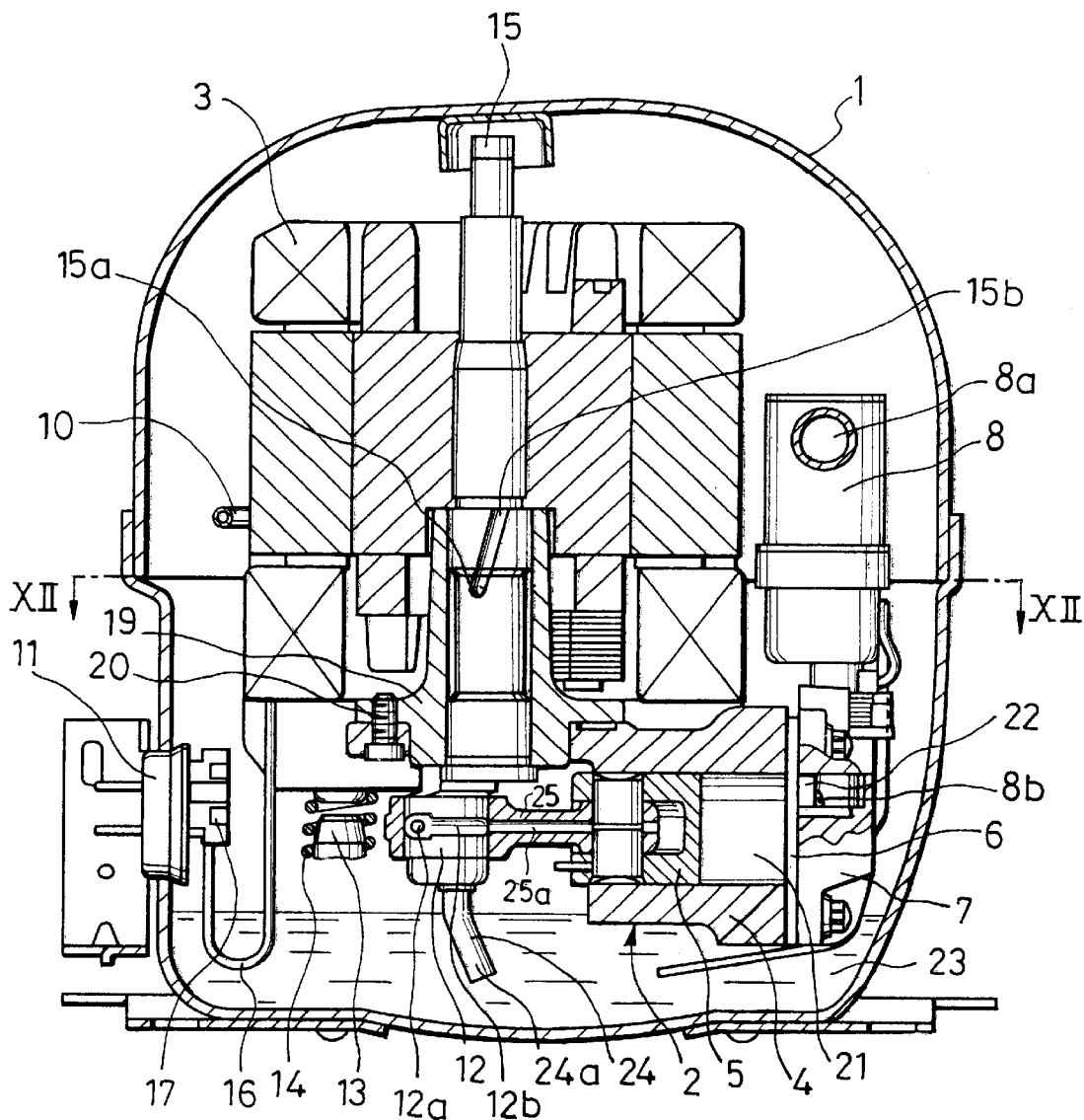
FIG. 13 is a vertical sectional view showing the main portion of the hermetic compressor in accordance with the embodiment 1, taken on line XIII—XIII of FIG. 12.

FIG. 12 is a sectional plan view showing the inside of a compressor in accordance with embodiment 1. As shown in this figure, the configuration of the embodiment 1 of the present invention is the same as that of the conventional example 2 in external appearances. FIG. 13 is a vertical sectional view showing the compressor in accordance with the embodiment 1, taken on line XIII—XIII of FIG. 12. However, side views instead of sectional views are shown for some portions of a valve plate 6 and a cylinder head 7.

A hermetic shell 1 is substantially cylindrical, and its diameter is nearly equal to its height, about 15 to 20 cm. The upper face and the lower face of the hermetic shell 1 are sealed to make its inner space hermetic. A compressing mechanism 2, an electric motor 3 and a suction muffler 8 are accommodated inside the hermetic shell 1.

The electric motor 3 is elastically supported by springs 14 on three snubbers 13 disposed at the bottom of the inside of the hermetic shell 1. Two of the three snubbers 13 are shown in FIG. 12, and the remaining one is shown in FIG. 13. By this elastic support, the vibration of the electric motor 3 during operation is absorbed by the springs 14, thereby unlikely to be transmitted to the hermetic shell 1. This reduces noise owing to the vibration of the electric motor 3. The electric motor 3 is installed so that its shaft 15 becomes substantially parallel with the axis of the hermetic shell 1. The electric motor 3 is electrically connected to an external power supply via a covered conductive wire cable 16, a tap portion 17 and a terminal connector 11.

As shown in FIG. 13, the compressing mechanism 2 comprises a cylinder 4, a piston 5 and a crank portion 12, and is secured with bolts 20 and the like to a bearing 19 and the like disposed under the electric motor 3. The crank portion 12 is made by casting so as to be integral with the lower end of the shaft 15 of the electric motor 3. The piston 5 reciprocates inside the cylinder 4 in the horizontal direction by virtue of the revolving force of the electric motor 3 transmitted via the crank portion 12. The space inside the cylinder 4 through which the piston 5 reciprocates is closed by the front end of the piston 5 and a valve plate 6 thereby to form a compression chamber 21 for a refrigerant gas. The valve plate 6 is provided with a suction valve for supplying the refrigerant gas into the compression chamber 21 by suction, and a discharge valve for discharging the refrigerant gas from the compression chamber 21, although these valves are not shown in FIG. 13. A cylinder head 7 is disposed outside the compression chamber 21, with the valve plate 6 held therebetween. A discharge pipe 10 is connected to the cylinder head 7 so that the refrigerant gas can be discharged from the inside of the cylinder head 7 to the outside of the hermetic shell 1.

On the other hand, the discharge outlet 8b of the suction muffler 8 is connected to the outside space 22 of the compression chamber. The inside of the suction muffler 8 is provided with a cavity communicating from the discharge outlet 8b to the suction inlet 8a of the suction muffler 8. The suction inlet 8a is connected to the opening end 9a of a suction pipe 9. The suction pipe 9 sucks the refrigerant gas from the outside to the inside of the hermetic shell 1.

The connection portion between the suction inlet 8a of the suction muffler 8 and the opening end 9a of the suction pipe 9 is connected so that a predetermined amount of refrigerant gas can leak from the connection portion into the hermetic shell 1. This eliminates any substantial difference in the pressure of the refrigerant gas between the inside and outside of the suction muffler 8. Therefore, the suction muffler 8 is not deformed by any difference in the pressure of the refrigerant gas between the inside and outside of the suction muffler 8. In addition, the pressure of the refrigerant gas inside the suction muffler 8 does not become lower than the pressure inside the compression chamber 21 at the time of suction. Therefore, a sufficient amount of the refrigerant gas can be sucked into the compression chamber 21.

With the above-mentioned configuration, the compressor of the embodiment 1 raises the pressure of the refrigerant gas and supplies the high-pressure refrigerant gas to an external refrigeration cycle.

When the electric motor 3 is driven, the piston 5 is reciprocated inside the cylinder 4 by the crank portion 12. The space inside the compression chamber 21 of the cylinder 4 is changed periodically in accordance with the reciprocation. The pressure of the refrigerant gas inside the compression chamber 21 lowers while the space inside the compression chamber 21 increases. At this time, the suction valve is opened by the pressure difference between the pressure at the outside space 22 of the compression chamber 21 and the pressure inside the compression chamber 21 thereby to suck the refrigerant gas discharged from the inside of the suction muffler 8 through the discharge outlet 8b thereof. On the other hand, the pressure of the refrigerant gas inside the compression chamber 21 rises while the space inside the compression chamber 21 decreases. At this time, the discharge valve is opened by the pressure difference between the pressure inside the cylinder head 7 and the pressure inside the compression chamber 21, whereby the high-pressure refrigerant gas is discharged from the compression chamber 21 into the cylinder head 7. The high-pressure refrigerant gas inside the cylinder head 7 passes through the discharge pipe 10 (FIG. 12) and is discharged to the high-pressure side of the refrigeration cycle outside the hermetic shell 1. The high pressure of the refrigerant gas is lowered in the refrigeration cycle. The refrigerant gas flowing from the low-pressure side of the refrigeration cycle passes through the suction pipe 9 and is supplied from the opening end 9a thereof into the suction muffler 8 through the suction inlet 8a. By periodically repeating the above-mentioned operation, the compressor of the embodiment 1 continuously supplies the high-pressure refrigerant gas to the refrigeration cycle.

The inner space in the hermetic shell 1 is sealed from outside. Therefore, noise caused by the electric motor 3, the compressing mechanism 2, the refrigerant gas sucked into the compression chamber 21 and the like is unlikely to leak outside. Furthermore, the hermetic shell 1 prevents lubrication oil circulating through the various portions of the electric motor 3 and the compressing mechanism 2 from scattering outside. In addition, the hermetic shell 1 stores the lubrication oil at the bottom of its inner space to prevent them from leaking outside.

The lubrication oil 23 stored at the bottom of the inside of the hermetic shell 1 is sucked up from an oil supply pipe 24 installed under the crank portion 12 as described below. The oil supply pipe 24 is bent so that its tip 24a is disposed on the center axis of the shaft 15. Therefore, when the crank portion 12 rotates, the lubrication oil 23 inside the oil supply pipe 24 is sucked up into the crank portion 12 by virtue of the centrifugal force. Part of the sucked lubrication oil passes through the small hole 12a of the crank portion 12, the groove 12b on the surface thereof and a space 25a inside a connecting rod 25 for connecting the piston 5 to the crank portion 12, and is supplied to the piston 5. Furthermore, the lubrication oil sucked up from the oil supply pipe 24 advances from the inside of the crank portion 12 to the inside of the shaft 15, passes through a small hole 15a in the shaft 15 and a groove 15b on the surface thereof, and is supplied to the shaft 15.

The suction muffler 8 operates to attenuate noise caused by a high-speed refrigerant gas flow sucked into the compression chamber 21. The refrigerant gas supplied into the suction muffler 8 from the suction inlet 8a thereof advances through the cavity inside the suction muffler 8, passes through the outside space 22 of the compression chamber 21 from the discharge outlet 8b and is sucked into the compression chamber 21. The shape of the cavity inside the suction muffler 8 is devised so as to sufficiently decrease the speed of the refrigerant gas flow while the refrigerant gas passes. For example, the suction muffler 8 may have partition walls so that the cavity inside the suction muffler 8 is partitioned into several chambers by the partition walls, although the partition walls are not shown in FIGS. 12 and 13. In this case, the refrigerant gas flow snakes through the chambers inside the suction muffler 8 in sequence, whereby the speed of the flow is lowered. This lowers the level of the noise caused by the refrigerant gas flow at the discharge outlet 8b of the suction muffler 8 or in the vicinity of the outside space 22 of the compression chamber 21.

As described below, the suction muffler 8 also operates to separate mist-like lubrication oil included in the refrigerant gas inside the suction muffler 8 so that the lubrication oil cannot be sucked into the compression chamber. When the refrigerant gas is sucked into the suction muffler 8 through the suction inlet 8a, lubrication oil floating in mist in the space inside the hermetic shell 1 is also sucked together with the refrigerant gas. If the mist-like lubrication oil is directly sucked into the compression chamber, the lubrication oil may attach to the suction valve or the discharge valve, thereby deteriorating their functions. Furthermore, if the lubrication oil is discharged to the refrigeration cycle through the discharge pipe 10, the lubrication oil may attach to various portions in the refrigeration cycle, thereby deteriorating the refrigeration capability of the refrigeration cycle. However, since the cavity inside the suction muffler 8 is partitioned into the plural chambers by the partition walls as described above, the refrigerant gas flow snakes through the chambers. At this time, the lubrication oil included in the refrigerant gas is apt to collide with and attach to the partition walls, since the lubrication oil is generally heavier than the refrigerant gas. The lubrication oil attached to the partition walls flows downward inside the suction muffler 8, and is discharged from a small hole (not shown) provided at the bottom portion of the suction muffler 8 to the bottom of the inside of the hermetic shell 1.

Figure 1:
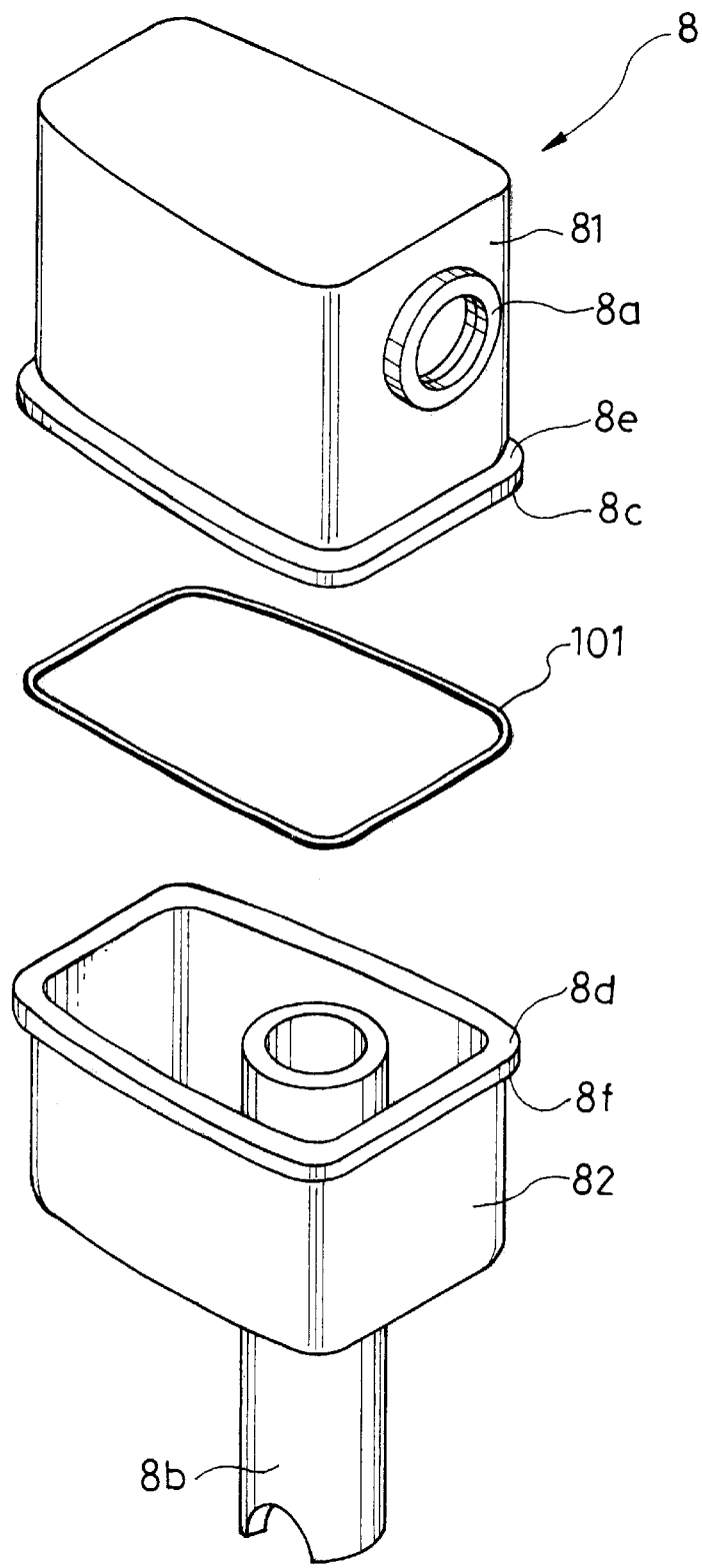
FIG. 1 is an exploded perspective view showing a suction muffler 8 in accordance with embodiment 1 of the present invention.
Figure 14:
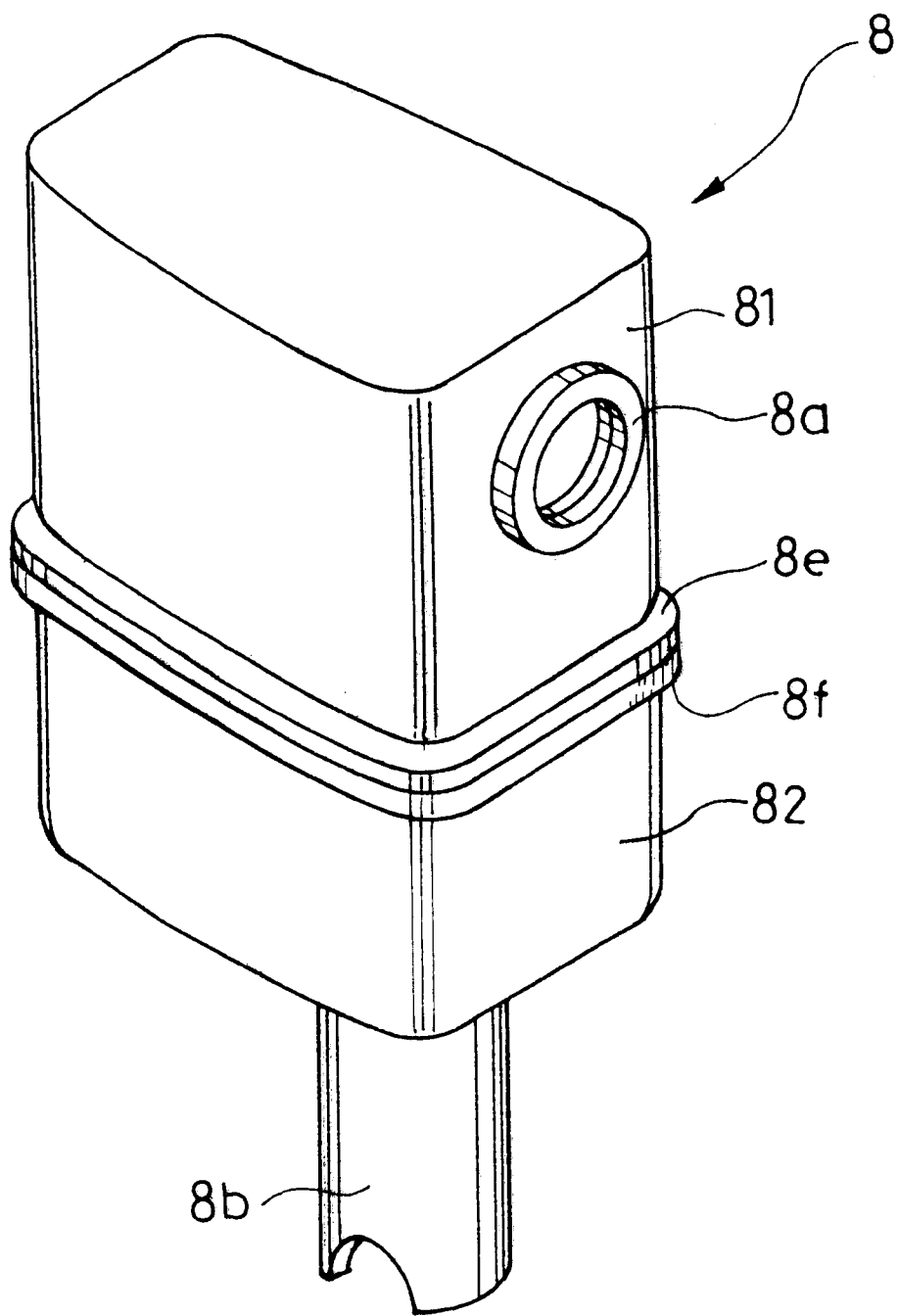
FIG. 14 is a perspective view showing a suction muffler 8 in accordance with the conventional example 2 and the embodiment 1 of the present invention.
Figure 15:
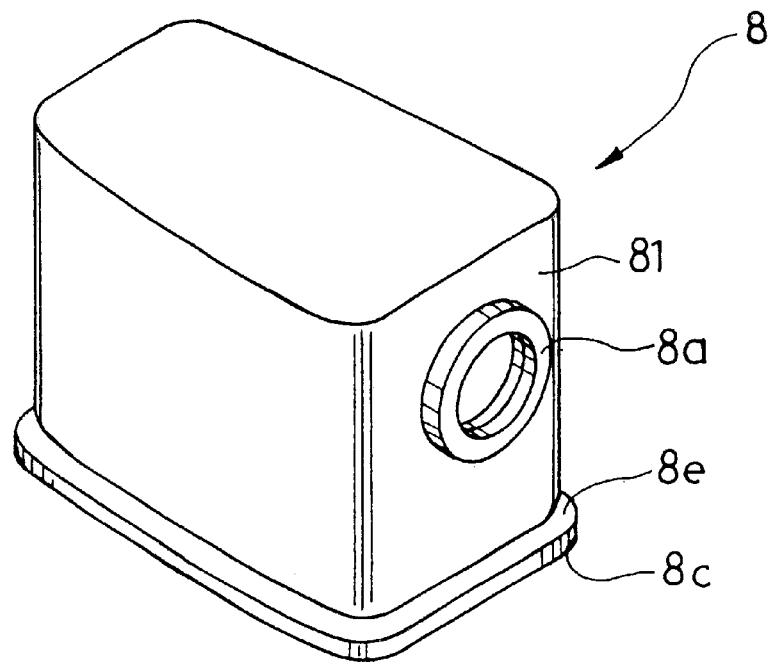
FIG. 15 is an exploded perspective view showing the suction muffler 8 in accordance with the conventional example 2.
Figure 15:
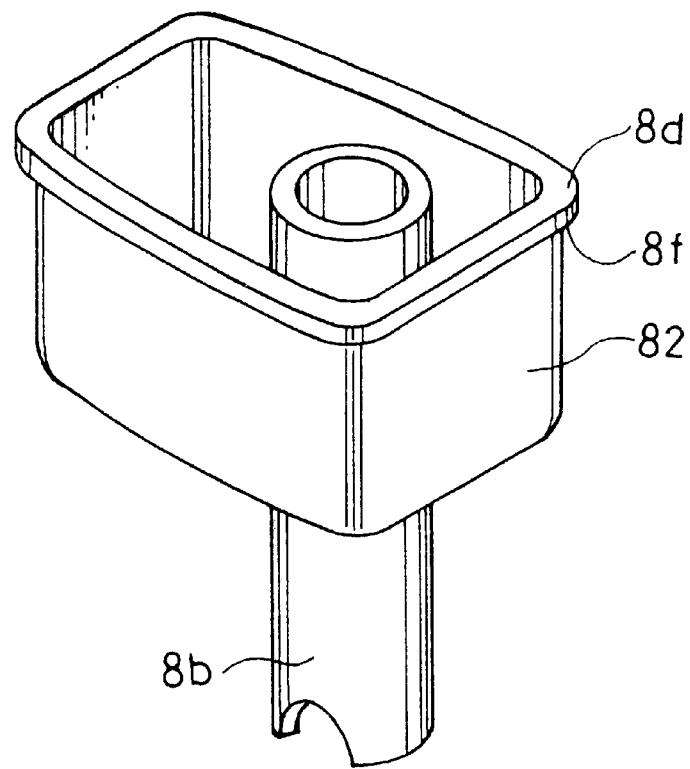
Figure 16:
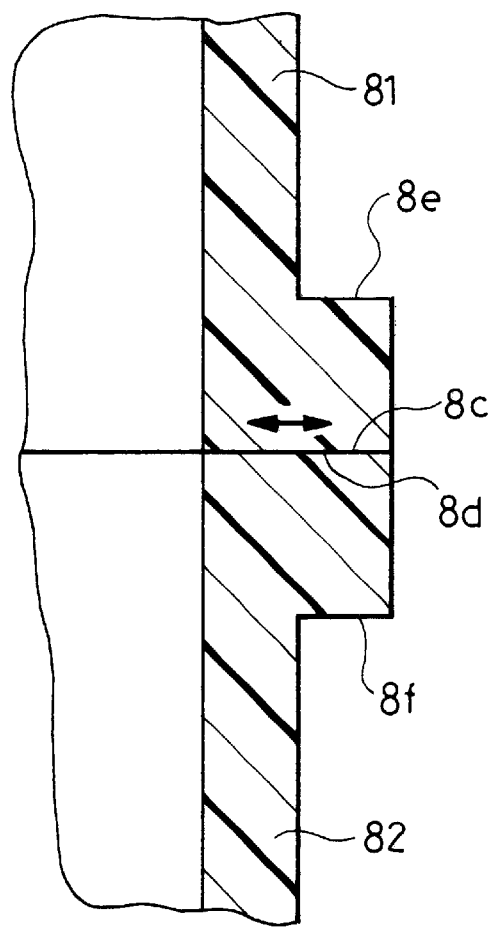
FIG. 16(a) and FIG. 16(b) are magnified vertical sectional views showing the vicinity of the joint portion during welding and after welding of the upper portion 81 and the lower portion 82 having one form and constituting the suction muffler 8 in accordance with the conventional example 2; respectively.
Figure 16:
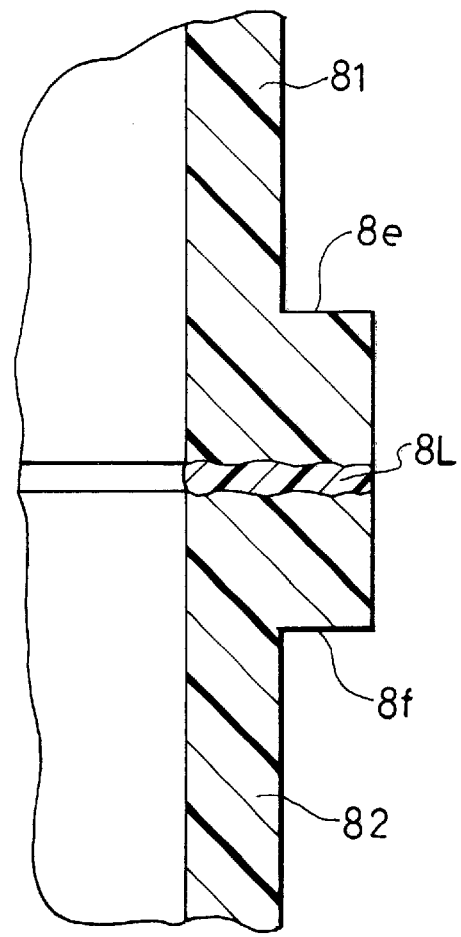

The suction muffler 8 is generally made of a thermoplastic synthetic resin having high formability and low thermal conductivity, such as polybutylene terephthanol (PBT). FIG. 14 is a perspective view showing the suction muffler 8, and FIG. 1 is an exploded perspective view thereof. As shown in FIG. 1, the suction muffler 8 comprises two portions 81 and 82 and a conductor 101 (iron loop) held between the two portions. The portions 81 and 82 are each formed by injection forming PBT, and each have a substantial shape of a rectangle measuring about 60 mm in width, about 25 mm in thickness and about 70 mm in height. The conductor 101 is preferably made of iron or stainless steel. The shape of the conductor 101 is nearly identical to that of the joining face 8c of the upper portion 81 and that of the joining face 8d of the lower portion 82, and is a thin-plate loop having a width smaller than those of the joining faces 8c and 8d. However, the loop is defined as a closed shape having no ends substantially, such as a ring, a polygon and the like. Whereas the widths of the joining faces 8c and 8d are about 7 mm, the width of the conductor 101 is about 1 to 2 mm, and the thickness thereof is about 0.2 to 0.4 mm. As clearly shown in FIGS. 14 and 1, the portions 81 and 82 are joined to each other including the conductor 101 held between the joining faces 8c and 8d thereof.

Figure 2:
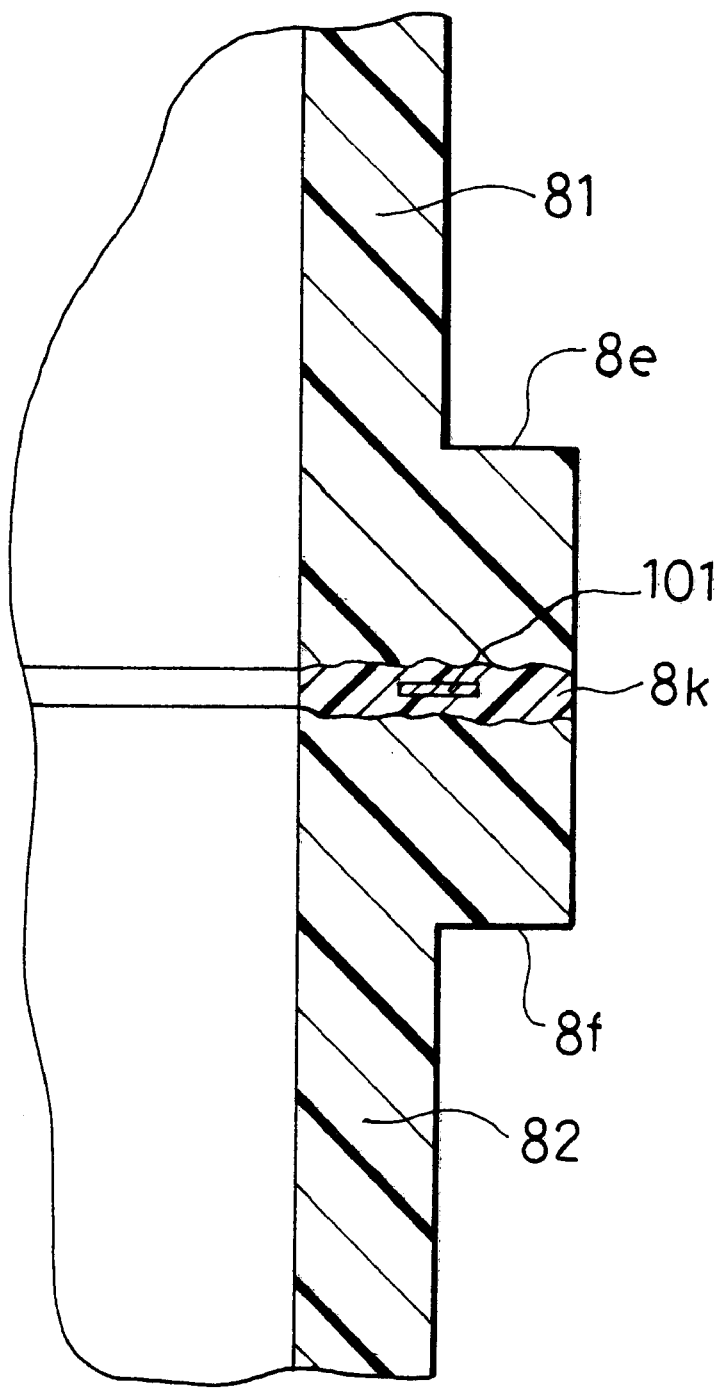
FIG. 2 is a magnified vertical sectional view showing the vicinity of the joint portion of the upper portion 81 and the lower portion 82 constituting the suction muffler 8 in accordance with the embodiment 1.

FIG. 2 is a magnified vertical sectional view showing the vicinity of the joint portion of the portions 81 and 82. The conductor 101 is embedded inside a welded portion 8k at the joint portion of the portions 81 and 82. The welded portion is herein defined as a portion formed when a melted resin solidifies at the time of welding.

This kind of joint portion is formed by induction welding as described below.

Figure 3:
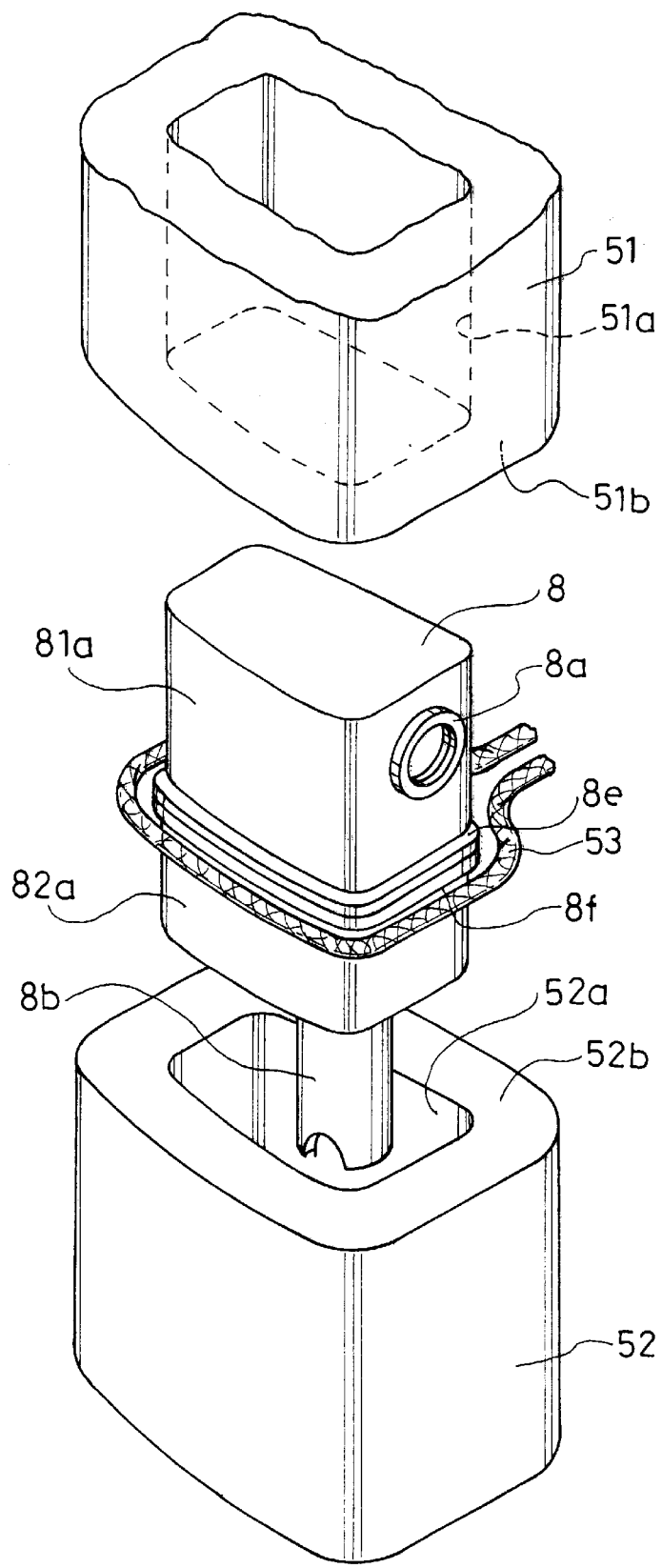
FIG. 3 is an exploded perspective view showing the outline of an apparatus for induction welding the suction muffler 8 in accordance with the embodiment 1.
Figure 4:
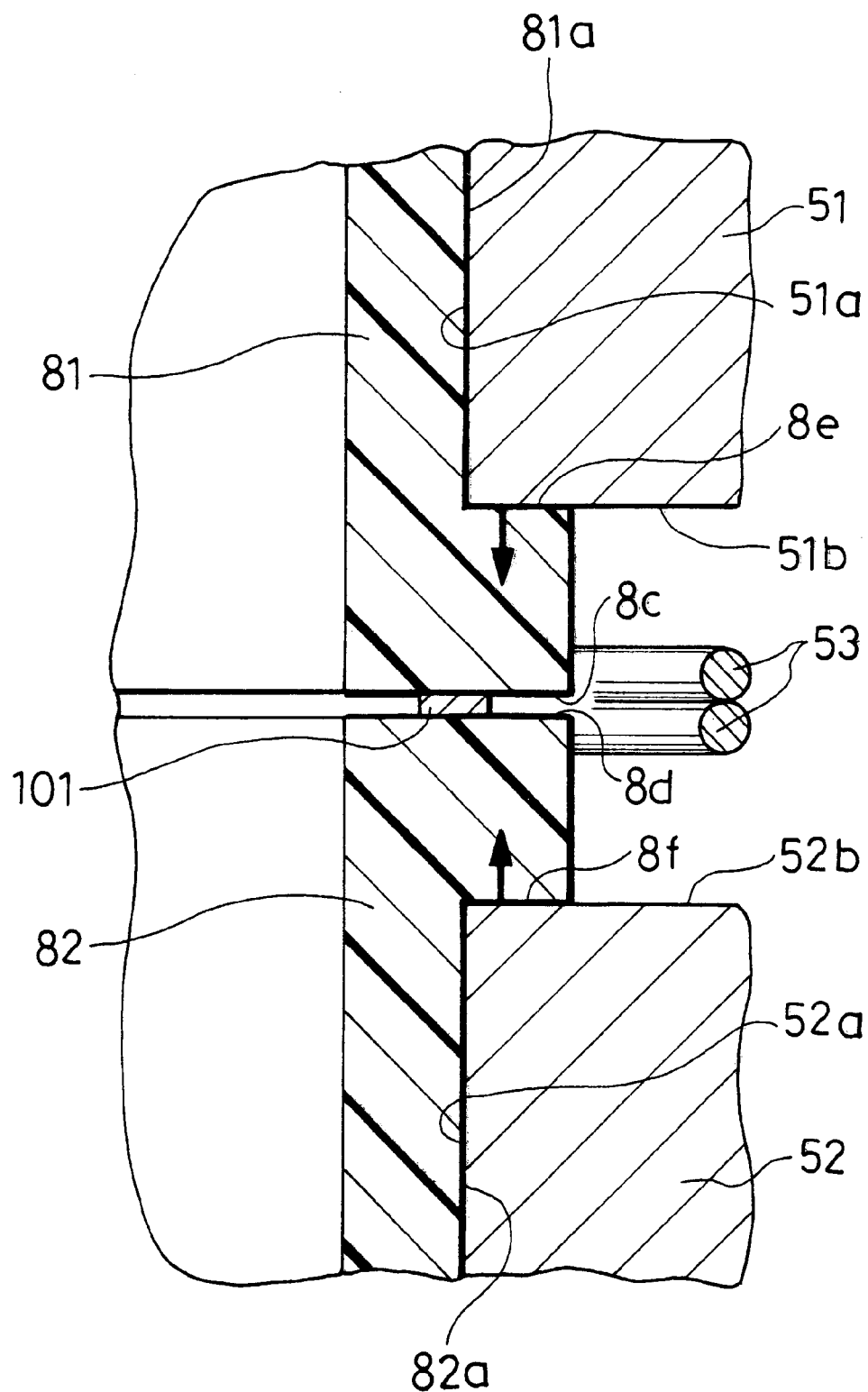
FIG. 4 is a magnified vertical sectional view showing the vicinity of the joint portion at the time when the suction muffler 8 in accordance with the embodiment 1 is subjected to induction welding.

FIG. 3 is an exploded perspective view showing the outline of an apparatus for induction welding the suction muffler 8. FIG. 4 is a magnified vertical sectional view showing the vicinity of the joint portion at the time when the suction muffler 8 is subjected to induction welding.

The upper pressing member 51 of the apparatus has a hollow portion 51a at the central portion of the lower face 51b thereof. The size of the hollow portion 51a is set to such an extent that the outside face 81a of the upper portion 81 of the suction muffler 8 makes contact with the inner face of the hollow portion 51a without substantial gap therebetween. Therefore, when the upper portion 81 is inserted into the hollow portion 51a, the lower face 51b makes contact with the upper flange 8e just outside the hollow portion 51a as shown in FIG. 4.

The lower pressing member 52 of the apparatus has a hollow portion 52a at the central portion of the upper face 52b thereof. The size of the hollow portion 52a is set to such an extent that the outside face 82a of the lower portion 82 of the suction muffler 8 makes contact with the inner face of the hollow portion 52a without substantial gap therebetween. Therefore, when the lower portion 82 is inserted into the hollow portion 52a, the upper face 52b makes contact with the lower flange 8f just outside the hollow portion 52a as shown in FIG. 4.

The lower face 51b of the upper pressing member 51 makes contact with the upper flange 8e, and the upper face 52b of the lower pressing member 52 makes contact with the lower flange 8f as shown in FIG. 4. In this condition, pressing force is applied to the upper pressing member 51 and the lower pressing member 52 to narrow the distance therebetween in the directions of the arrows shown in FIG. 4. This pressing force deforms the uneven portions on the joining faces 8c and 8d generally caused by the warps at the time of injection forming, whereby the joining faces 8c and 8d make contact with both faces of the conductor 101 without gap. Since the unevenness on the joining faces 8c and 8d is generally about 0.5 to 1 mm, a pressing force of about 5 to 10 N (about 50 to 100 kgf) is used to deform the uneven portions in the embodiment 1. This value of the pressing force is smaller than the value of about 10 N (about 100 kgf) used for the conventional vibration welding. In the case of the conventional vibration welding, it has been necessary that the joining faces 8c and 8d make contact with each other on the whole parts without gap. On the contrary, in the case of the induction welding, it is only necessary that the joining faces 8c and 8d just make contact with the surfaces of the conductor 101 without gap. In other words, since the contact area is smaller, the pressing force for the induction welding is less than that for the vibration welding. It is preferable that the pressing force is applied only to the flanges 8e and 8f to prevent portions other than the joint portion of the portions 81 and 82 from being deformed by the pressing force. In the embodiment 1, the widths of the flanges 8e and 8f are about 3 mm, and the thicknesses thereof are about 2 to 4 mm.

During the application of the pressing force to the upper pressing member 51 and the lower pressing member 52 as described above, an alternating current (A.C.) is applied to a coil 53 disposed between the lower face 51b of the upper pressing member 51 and the upper face 52b of the lower pressing member 52 to surround the conductor 101. As a result, an A.C. magnetic field is generated passing vertically through the plane surrounded by the coil 53, that is, the plane surrounded by the conductor 101. This magnetic field generates an induction current circulating in the conductor 101. This induction current generates Joule heat inside the conductor 101, thereby raising the temperature of the conductor 101 and the portions 81 and 82 disposed around the conductor 101. When the temperature becomes higher than the melting point of the thermoplastic resin PBT used to form the portions 81 and 82, the resin around the conductor 101 is melted. When the gap between the conductor 101 and the joining faces 8c and 8d is filled with a melted portion 8k as shown in FIG. 2, the alternating current for the coil 53 is shut off. The melted portion 8k then becomes cool and solidifies, thereby forming a welded portion. As a result, the conductor 101 and the joining faces 8c and 8d are welded so as to be integrated.

In the embodiment 1, the frequency of the alternating current (A.C.) is about 200 kHz, the effective value of the A.C. is about 0.3 A, the effective value of the A.C. voltage is about 1 kV, the power consumption is about 450 W, and the time of current application is about 2 to 4 sec. As a result, the conductor 101 is preferably heated to about 220 to 230° C. After the alternating current is shut of f, this shut-off condition is maintained for about 40 sec, thereby allowing the melted portion 8k to solidify sufficiently. In this way, in the embodiment 1, the volume of the melted portion 8k is adjusted to the extent that the melted portion 8k is not squeezed out of the joining faces 8c and 8d. In other words, the melted portion 8k is confined in a range of about 0.3 mm in the vertical direction from the joining faces 8c and 8d originally defined before the welding.

In the embodiment 1, the shape of the conductor 101 is a thin-plate loop. The sectional shape thereof may be elliptic, polygonal or the like. Furthermore, the surfaces of the conductor 101 may be uneven at the portions making contact with the joining faces 8c and 8d. Moreover, the conductor 101 may also have a shape wherein its width is substantially equal to its thickness. In either of the above-mentioned shapes, the conductor 101 should only be configured so that the surfaces of the conductor 101 can be covered with the melted resin without gap at the time of the induction welding thereby to obtain sufficient welding strength.

EMBODIMENT 2

Embodiment 2 differs from the embodiment 1 only in the shape of the joint portion of the suction muffler 8. Portions other than the joint portion are the same as those of the embodiment 1, and their descriptions are omitted.

Figure 5:
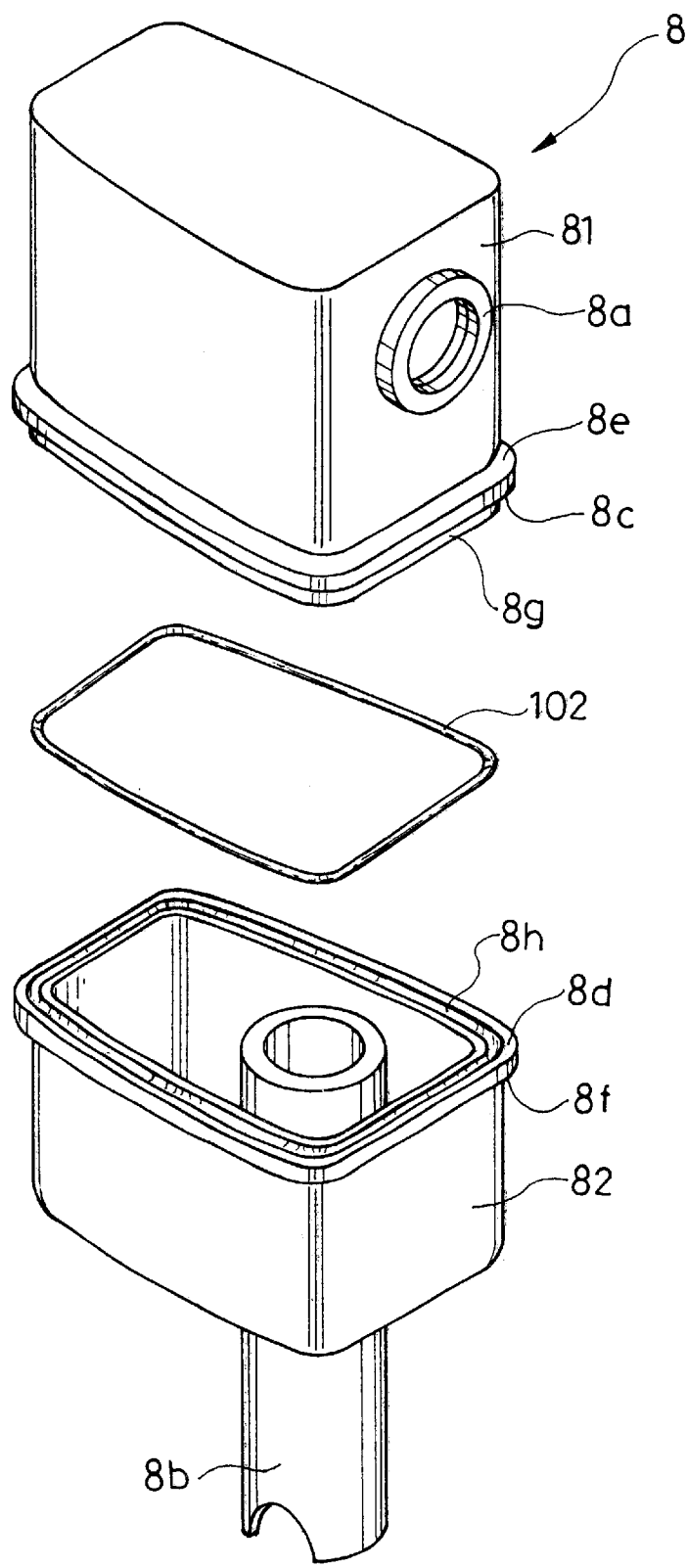
FIG. 5 is an exploded perspective view showing a suction muffler 8 in accordance with embodiment 2.

FIG. 5 is an exploded perspective view showing the suction muffler 8 of the embodiment 2. As shown in FIG. 5, the suction muffler 8 comprises two portions 81 and 82 and a conductor 102 held between the two portions. The portions 81 and 82 are each formed by injection forming PBT, and each have a substantial shape of a rectangle measuring about 60 mm in width, about 25 mm in thickness and about 70 mm in height. A projection 8g is formed along the central portion of the joining face 8c of the upper portion 81. On the other hand, a groove 8h is formed along the central portion of the joining face 8d of the lower portion 82. The vertical sectional shapes of the projection 8g and the groove 8h are rectangular, and they are substantially identical to each other in size. In the embodiment 2, the vertical cross section of the projection 8g measures about 1 mm in width and about 1.7 mm in height. The vertical cross section of the groove 8h measures about 1 mm in width and about 2 mm in height. The conductor 102 is preferably made of iron or stainless steel. The conductor 102 is a loop, and its circumferential length is substantially identical to those of the joining face 8c of the upper portion 81 and the joining face 8d of the lower portion 82. The vertical sectional shape of the conductor 102 is a circle having a diameter of about 0.7 mm. The vertical sectional area of the conductor 102 is substantially identical to that of the conductor 101 of the embodiment 1.

Figure 6:
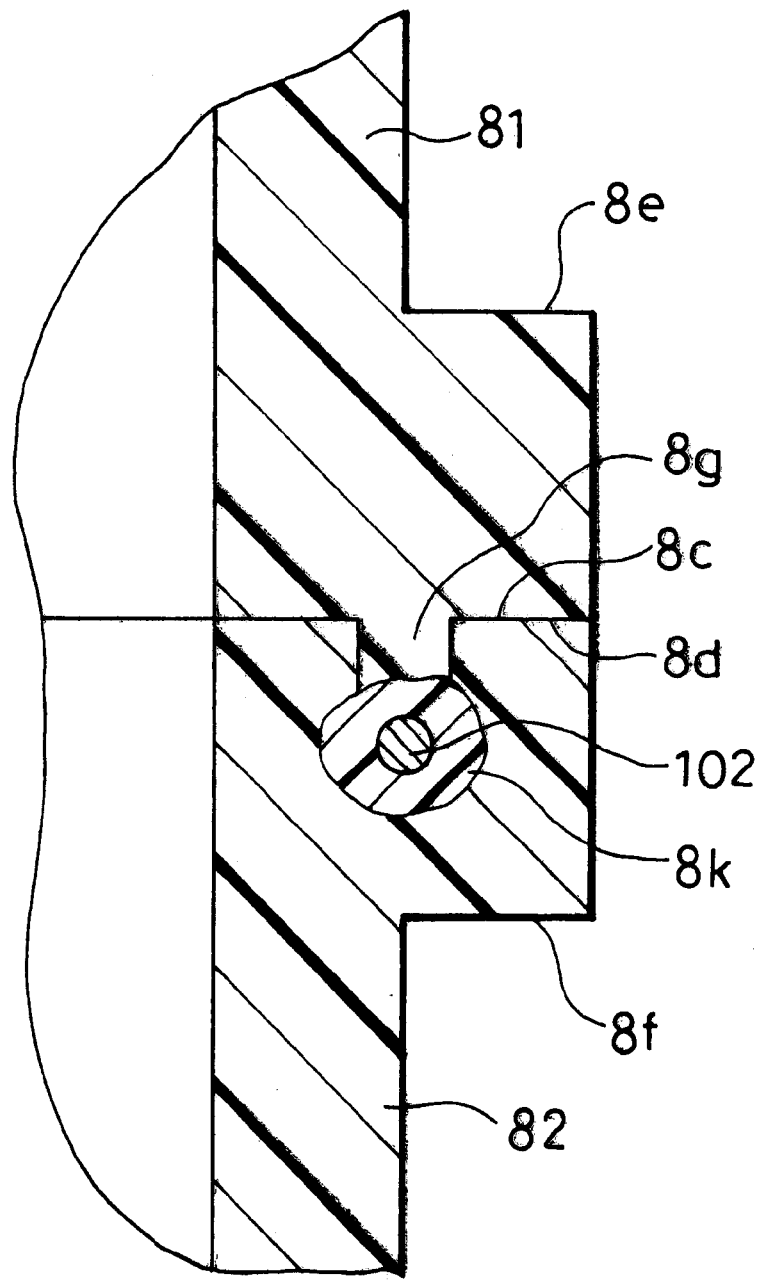
FIG. 6 is a magnified vertical sectional view showing the vicinity of the joint portion of the upper portion 81 and the lower portion 82 constituting the suction muffler 8 in accordance with the embodiment 1.

FIG. 6 is a magnified vertical sectional view showing the vicinity of the joint portion of the portions 81 and 82. A welded portion 8k is present between the projection 8g of the upper joining face 8c and the groove 8h of the lower joining face 8d. The conductor 102 is embedded in the welded portion 8k. The projection 8g and the groove 8h are made contact and fitted with each other without gap.

This kind of welded portion 8k is formed by induction welding in such an apparatus as shown in FIG. 3, just as in the case of the embodiment 1. Since the details of the welding are the same as those of the embodiment 1, their descriptions are omitted.

Figure 7:
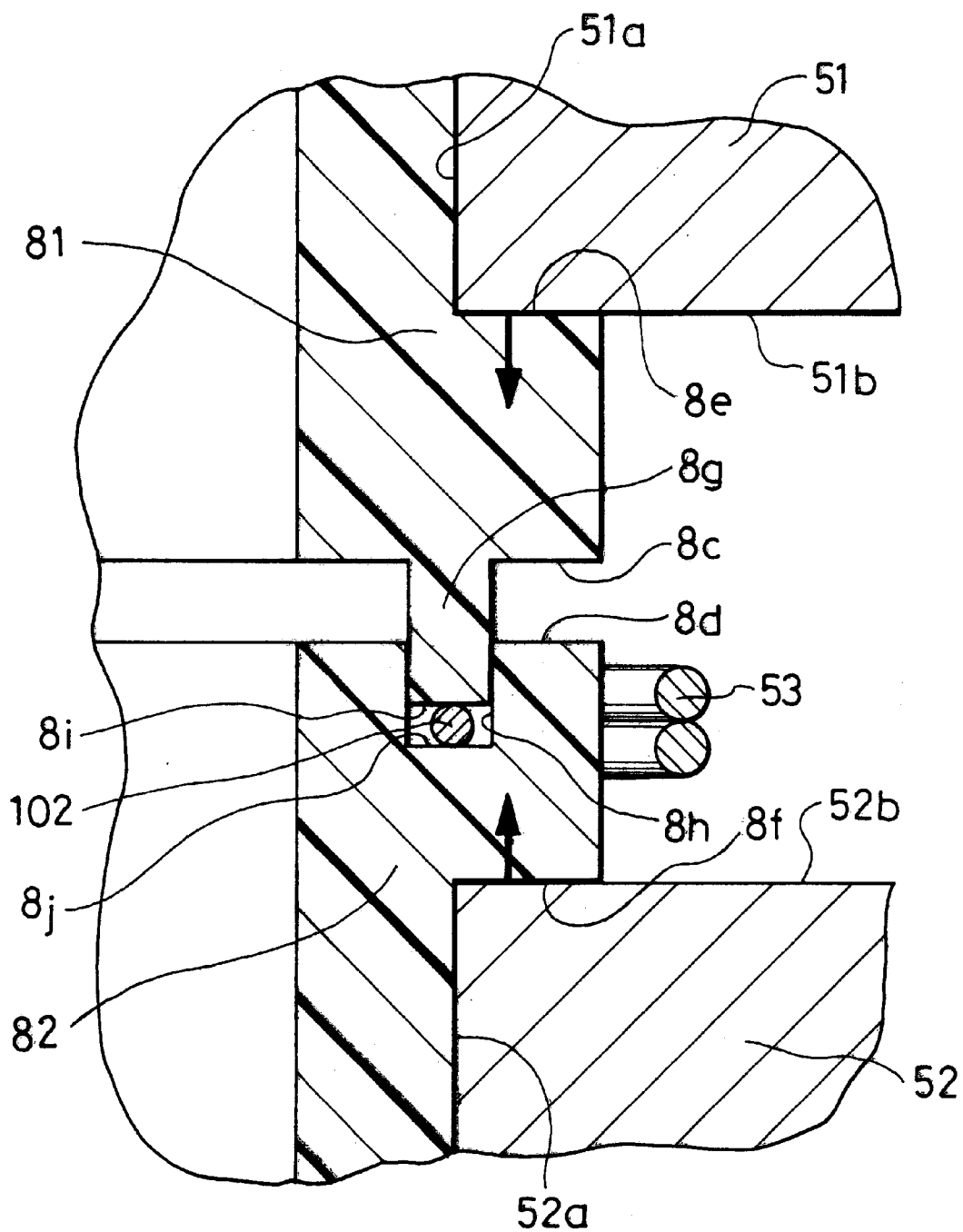
FIG. 7 is a magnified vertical sectional view showing the vicinity of the joint portion at the time when the suction muffler 8 in accordance with the embodiment 2 is subjected to induction welding.
Figure 8:
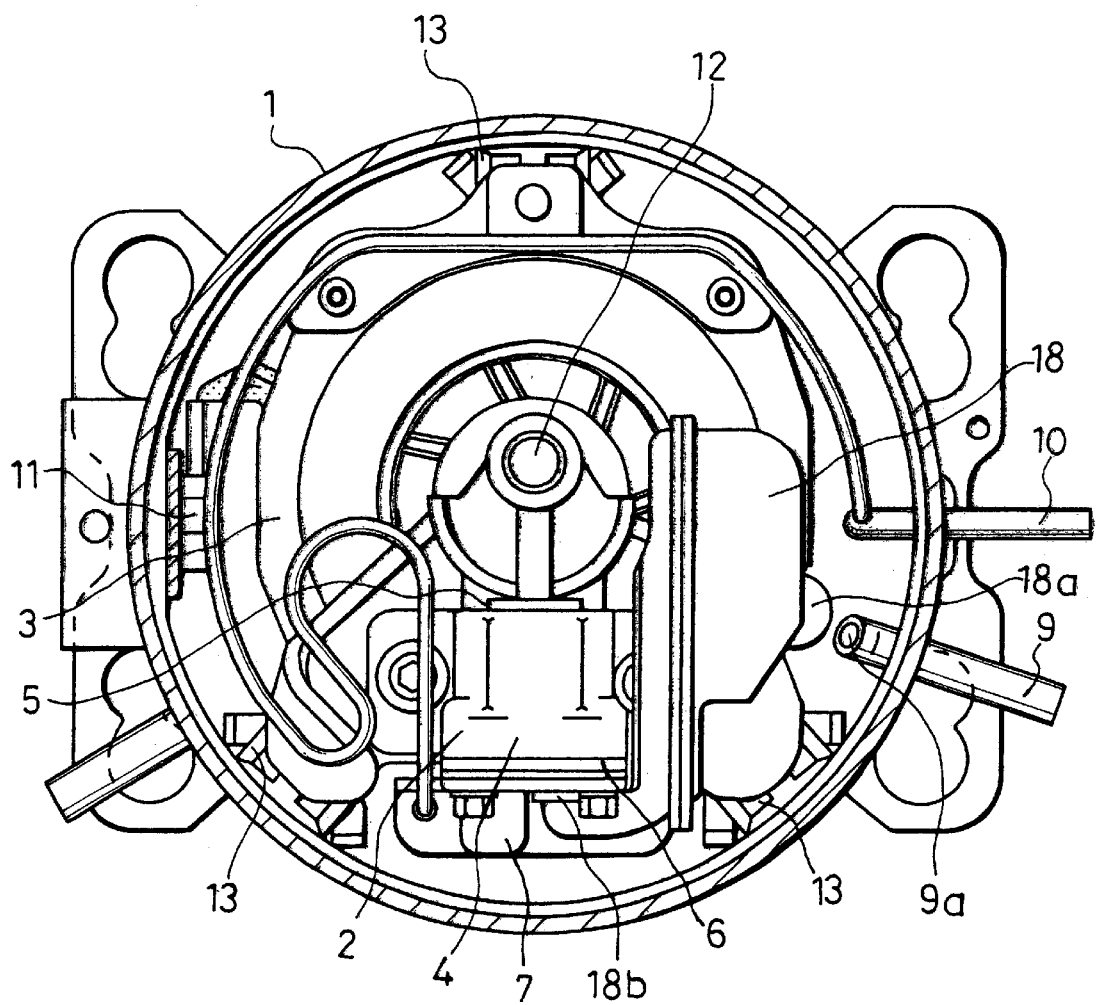
FIG. 8 is a sectional plan view showing the inside of a compressor in accordance with conventional example 1.
Figure 9:
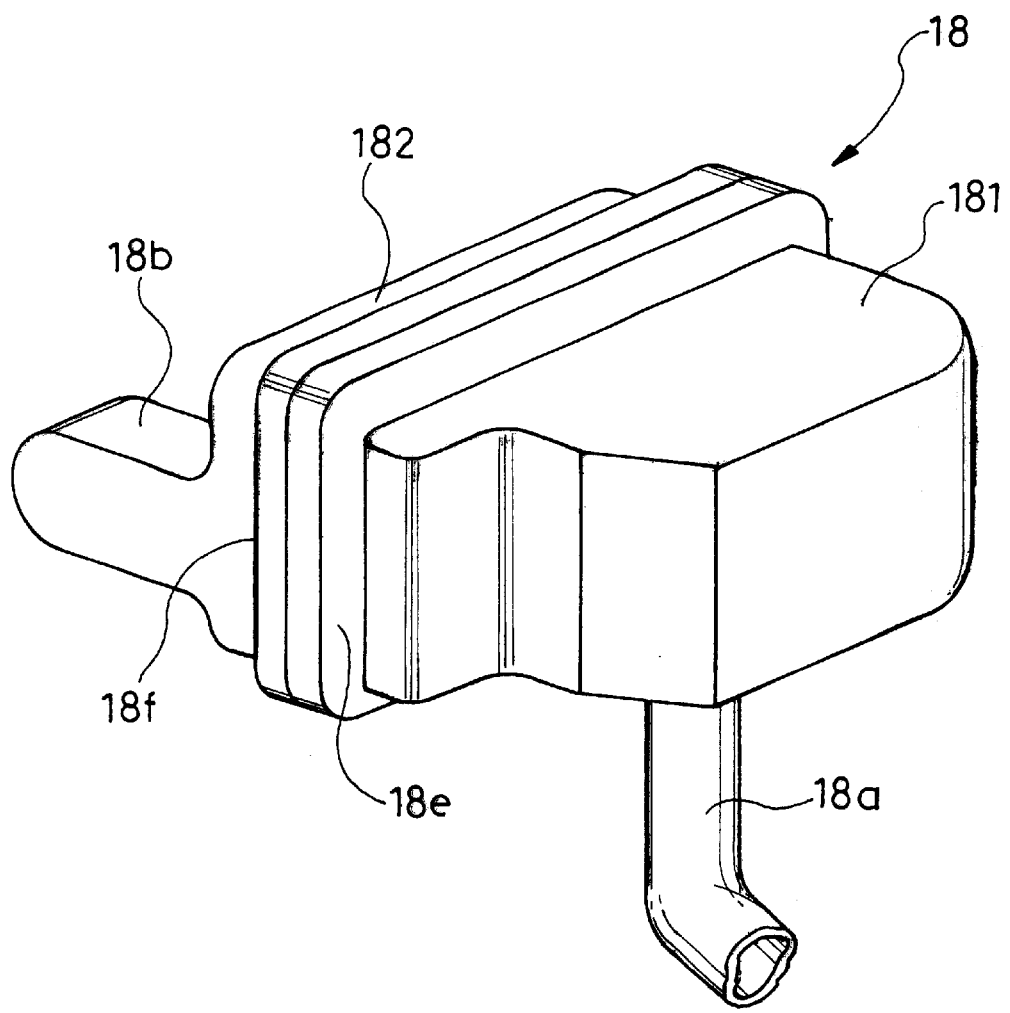
FIG. 9 is a perspective view showing a suction muffler 18 in accordance with the conventional example 1.
Figure 10:
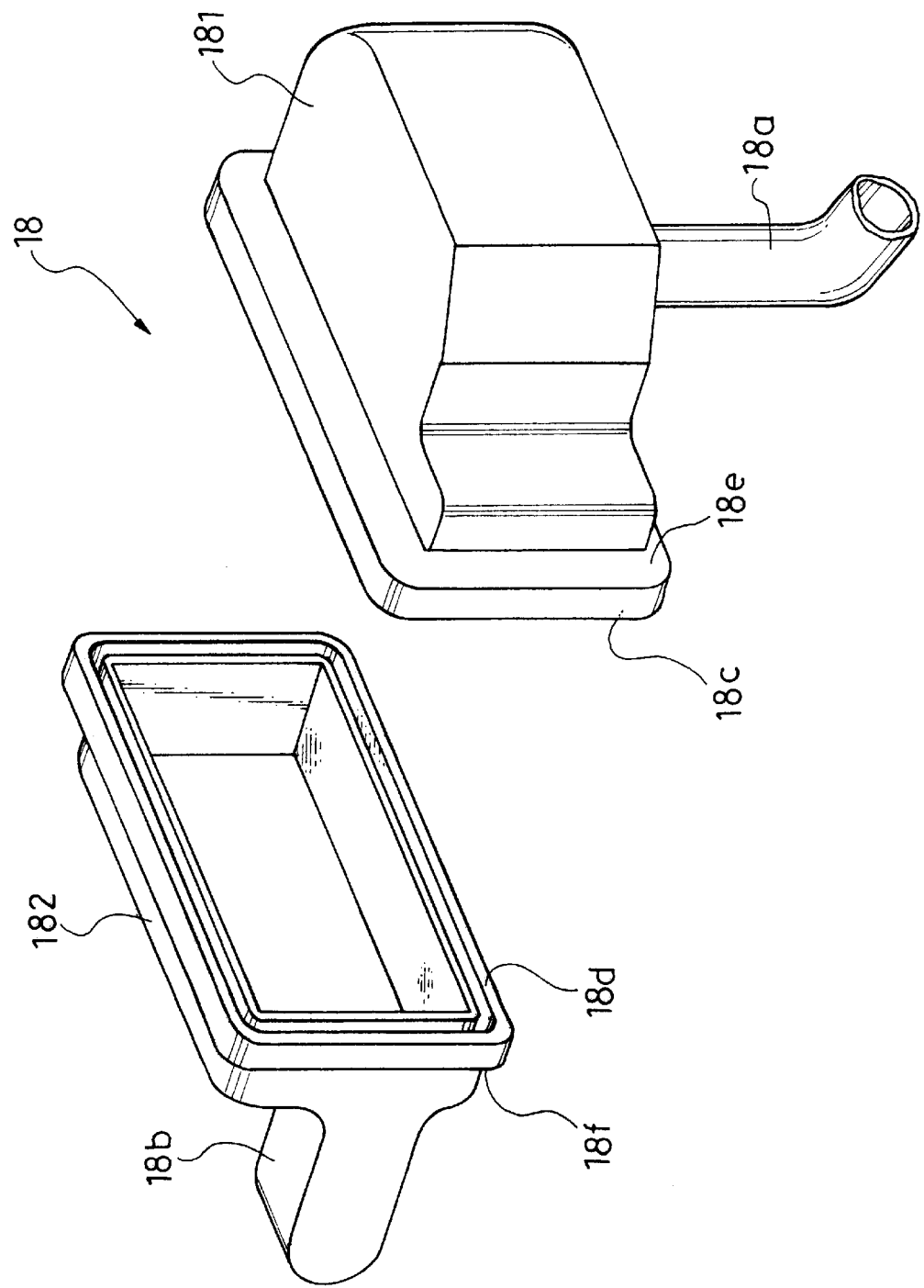
FIG. 10 is an exploded perspective view showing the suction muffler 18 in accordance with the conventional example 1.
Figure 11A:
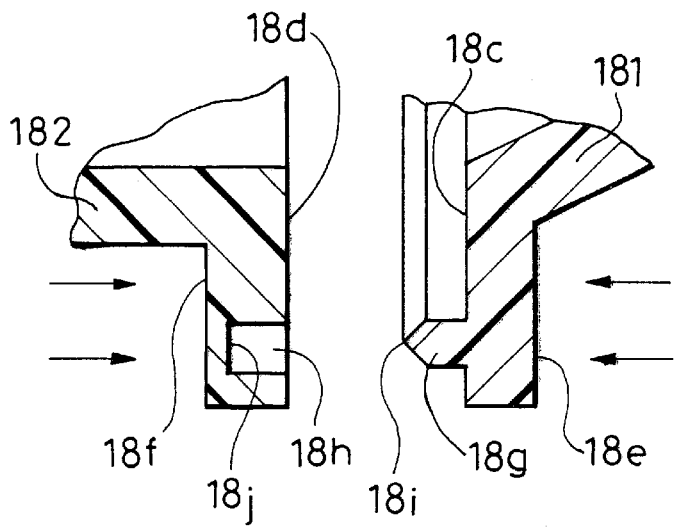
FIG. 11(a), FIG. 11(b) and FIG. 11(c) are magnified vertical sectional views showing the vicinity of the joint portion before, during and after welding of the portions 181 and 182 constituting the suction muffler 18 in accordance with the conventional example 1.
Figure 11B:
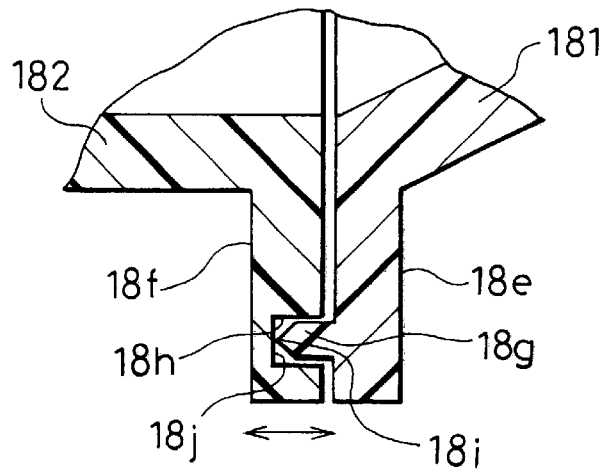
Figure 11C:
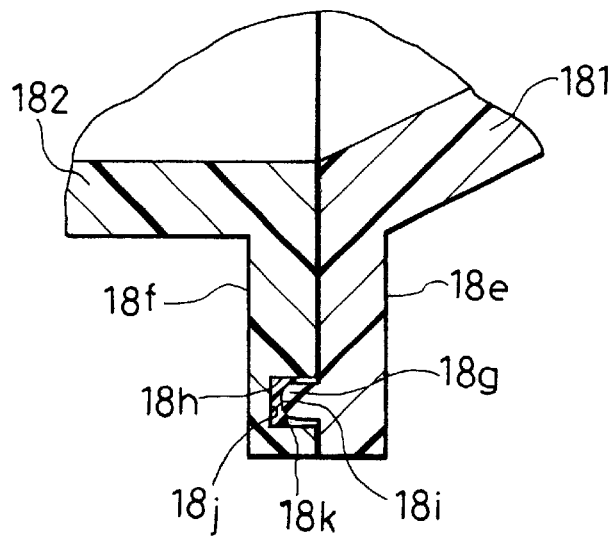

FIG. 7 is a magnified vertical sectional view showing the vicinity of the joint portion at the time when the suction muffler 8 is subjected to induction welding. Just as in the case of the embodiment 1, the lower face 51b of the upper pressing member 51 makes contact with the upper flange 8e, and the upper face 52b of the lower pressing member 52 makes contact with the lower flange 8f. In this contact condition, pressing force is applied to the upper pressing member 51 and the lower pressing member 52 to narrow the distance therebetween in the directions of the arrows shown in FIG. 7. The conductor 102 is held between the tip 8i of the projection 8g on the upper joining face 8c and the bottom 8j of the groove 8h in the lower joining face 8d. When pressing force is applied to the upper pressing member 51 and the lower pressing member 52 as described above, the tip 8i of the projection 8g and the bottom 8j of the groove 8h are deformed and make contact with the surfaces of the conductor 102 without substantial gap. The embodiment 2 uses a pressing force of about 5 to 10 N (about 50 to 100 kgf). This value of the pressing force is smaller than the value used for the conventional vibration welding. This is because, in comparison with the conventional vibration welding, the induction welding in accordance with the embodiment 2 requires a small area to be contacted without gap, that is, an area as large as approximately the surface area of the conductor 102. Just as in the case of the embodiment 1, it is preferable that the pressing force is applied only to the flanges 8e and 8f to prevent portions other than the joint portion of the portions 81 and 82 from being deformed by the pressing force. In the embodiment 2, the widths of the flanges 8e and 8f are about 3 mm, and the thicknesses thereof are about 2 to 4 mm.

In the condition wherein the pressing force is applied to the upper pressing member 51 and the lower pressing member 52 as described above, an alternating current is applied to a coil 53 disposed between the lower face 51b of the upper pressing member 51 and the upper face 52b of the lower pressing member 52 to surround the conductor 102. As a result, an induction current circulating in the conductor 102 generates just as in the case of the embodiment 1. This induction current generates Joule heat inside the conductor 102, thereby raising the temperature of the conductor 102 and the tip 8i of the projection 8g and the bottom 8j of the groove 8h making contact with the conductor 102. When the temperature becomes higher than the melting point of the thermoplastic resin PBT used to form the tip 8i of the projection 8g and the bottom 8j of the groove 8h, the resin around the conductor 102 is melted. When the gap between the conductor 102, the projection 8g and the groove 8h is filled with a melted portion 8k as shown in FIG. 6, the alternating current for the coil 53 is shut off. The melted portion 8k then becomes cool and solidifies, thereby forming a welded portion. As a result, the conductor 102, the projection 8g and the groove 8h are welded so as to be integrated.

In the embodiment 2, the frequency of the A.C. is about 200 kHz. the effective value of the A.C. is about 0.3 A, the effective value of the A.C. voltage is about 1 kV, the power consumption is about 450 W. and the time of current application is about 2 to 4 sec. As a result, the conductor 102 is preferably heated to about 220 to 230° C. After the alternating current is shut off, this shut-off condition is maintained for about 40 sec, thereby allowing the melted portion 8k to solidify sufficiently. These values are identical to those of the embodiment 1 because the vertical sectional area of the conductor 102 of the embodiment 2 is substantially identical to that of the conductor 101 of the embodiment 1. In this way, in the embodiment 2, the volume of the melted portion 8k is adjusted to the extent that the melted portion 8k is not squeezed out of the joining faces 8c and 8d. In particular, in the embodiment 2, the width of the projection 8g is substantially identical to that of the groove 8h, and the projection 8g is fitted into the groove 8h without gap, thereby eliminating any gap through which a melted resin leaks at the time of welding. The melted portion 8k is confined in a range of about 0.3 mm in the vertical direction from the tip 8i of the projection 8g and the bottom 8j of the groove 8h originally defined before the welding.

In the embodiment 2, the conductor 102 is a loop of a conductive wire having a circular vertical cross-section. However, the conductor 102 may have other sectional shapes, such as ellipse, polygon or the like. Furthermore, the surfaces of the conductor 102 may be uneven at portions making contact with the tip 8*i* of the projection 8*g* and the bottom 8*j* of the groove 8*h*. In addition to these shapes, the shape of the conductor 102 may be a thin plate, just like the conductor 101 of the embodiment 1. In either of the above-mentioned shapes, the conductor 102 should only be configured so that the surfaces of the conductor 102 can be covered with the melted resin without gap at the time of the induction welding thereby to obtain sufficient welding strength.

Furthermore, the conductor 101 of the embodiment 1 and the conductor 102 of the embodiment 2 may be a helical coil, or a loop having holes with axes thereof orthogonal to the longitudinal direction of the loop disposed at some intervals. The directions of the axes of the holes may be vertical, horizontal or inclined to both the vertical and the horizontal directions. These shapes allow the melted portion between the joining faces to have a larger volume, thereby offering higher welding strength. However, since the conductor is complicated in shape, the efficiency of the induction heating is lowered. In addition, since the volume of the resin to be melted is larger, it takes longer time for welding.

In both cases of the embodiments 1 and 2, the joining faces are on the same plane. Even if the joining faces have complicated shapes, such as curved faces and the like, and they are disposed on plural planes on different levels on the whole, the induction welding can be used effectively. Therefore, the present invention can form even a suction muffler provided with joining faces having complicated shapes incapable of being joined by the conventional vibration welding.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

In accordance with the present invention, the welding strength at the joint portion is high, whereby it is possible to stabilize the quality of the suction muffler of the hermetic compressor. For this reason, the present invention has high industrial applicability.

What is claimed is:

1. In a hermetic compressor comprising:
   a hermetic shell having a hermetically sealed inner space,
   an electric motor elastically supported inside said hermetic shell,
   a compressing mechanism driven by said electric motor and used to compress a refrigerant gas thereby to raise the pressure thereof, and
   a suction muffler for passing said refrigerant gas therethrough prior to said compressing mechanism;
   said suction muffler having:
   a) plural portions made of a thermoplastic resin and to be joined to each other at a joint portion by induction welding, and
   b) a loop conductor embedded in said joint portion between said portions along said joint portion.

2. A suction muffler in accordance with claim 1, wherein, at said joint portion, one of said portions is provided with a projection, the other of said portions is provided with a groove to accommodate said projection, and said conductor is disposed and secured between the tip of said projection and said groove by welding.

3. A suction muffler in accordance with claim 2, wherein the width of said projection is substantially identical to that of said groove.

4. A suction muffler in accordance with claim 1, wherein said joint portion is substantially on plural planes of different levels.

5. A suction muffler in accordance with claim 1 wherein the width of the vertical cross section of said conductor is substantially identical to the thickness thereof.

6. A suction muffler in accordance with claim 1 wherein the width of the vertical cross section of said conductor is substantially larger than the thickness thereof.

7. A suction muffler in accordance with claim 1 wherein the shape of said conductor is substantially helical.

8. A suction muffler in accordance with claim 1 wherein said conductor has plural holes with axes orthogonal to the longitudinal direction thereof.

9. A hermetic compressor comprising:
   a hermetic shell having a hermetically sealed inner space;
   an electric motor elastically supported inside said hermetic shell;
   a compressing mechanism driven by said electric motor and used to compress a refrigerant gas thereby to raise the pressure thereof; and
   a suction muffler for passing said refrigerant gas prior to said compressing mechanism, and having:
   a) plural portions made of a thermoplastic resin and to be joined to each other at a joint portion by induction welding; and
   b) a loop conductor embedded in said joint portion between said portions along said joint portion.

10. A hermetic compressor in accordance with claim 9, wherein one of said portions is provided with a projection, the other of said portions is provided with a groove to accommodate said projection, and said conductor is disposed and secured between the tip of said projection and said groove by welding.

11. A hermetic compressor in accordance with claim 10, having said suction muffler wherein the width of said projection is substantially identical to that of said groove.

12. A hermetic compressor in accordance with claim 9, having said suction muffler wherein said joint portion is substantially on plural planes of different levels.

13. A hermetic compressor in accordance with claim 9, wherein the width of the vertical cross section of said conductor is substantially identical to the thickness thereof.

14. A hermetic compressor in accordance with claim 9, wherein the width of the vertical cross section of said conductor is substantially larger than the thickness thereof.

15. A hermetic compressor in accordance with claim 9, wherein the shape of said conductor is substantially helical.

16. A hermetic compressor in accordance with claim 9, wherein said conductor has plural holes with axes orthogonal to the longitudinal direction thereof.

* * * * *